United States Patent
Srinivasan et al.

(10) Patent No.: US 11,232,410 B2
(45) Date of Patent: Jan. 25, 2022

(54) ON-CALL SCHEDULING AND ENHANCED CONTACT PREFERENCE MANAGEMENT

(71) Applicant: ServiceNow, Inc., Santa Clara, CA (US)

(72) Inventors: Sheeba Srinivasan, Atlanta, GA (US); Valencio Cardoso, San Diego, CA (US); Soumya Mitra, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 144 days.

(21) Appl. No.: 16/534,827

(22) Filed: Aug. 7, 2019

(65) Prior Publication Data
US 2021/0042707 A1   Feb. 11, 2021

(51) Int. Cl.
G06Q 10/10   (2012.01)
G06F 9/54   (2006.01)
(Continued)

(52) U.S. Cl.
CPC ......... G06Q 10/1093 (2013.01); G06F 9/542 (2013.01); G06F 11/0781 (2013.01); G06Q 10/063116 (2013.01)

(58) Field of Classification Search
CPC .... G06F 9/542; G06F 11/0781; G06F 11/327; G06Q 10/06; G06Q 10/063; G06Q 10/0631; G06Q 10/06311; G06Q 10/063116; G06Q 10/063118; G06Q 10/06314; G06Q 10/06316; G06Q 10/067; G06Q 10/0633; G06Q 10/20; G06Q 10/10;
(Continued)

(56) References Cited

U.S. PATENT DOCUMENTS 6,321,229 B1   11/2001   Goldman
6,609,122 B1   8/2003   Ensor
(Continued)

FOREIGN PATENT DOCUMENTS

CA   2769048 A1 * 10/2001   ........... H04L 69/329

OTHER PUBLICATIONS

"On-Call Scheduling Management - ServiceNOW", LearnNOW, Youtube.com, https://www.youtube.com/watch?v=51oaNwu5Z30 (Year: 2017).*

(Continued)

*Primary Examiner* — Shelby A Turner
(74) *Attorney, Agent, or Firm* — Fletcher Yoder PC

(57) ABSTRACT

Scheduling information for each of plural shifts of an on-call schedule is set based on user operation at design-time within an on-call scheduling user interface. The scheduling information includes an escalation path graphical outline having at least one escalation step element and a corresponding wait duration element. An escalation path associated with a current one of the plural shifts of the on-call schedule at run-time is executed in response to a predetermined condition being satisfied. An on-call user associated with the current one of the shifts is notified based on the escalation path. The escalation path is configured to make a first notification attempt to notify the on-call user based on a first attempt contact preference selected by the on-call user, and make a second notification attempt to notify the on-call user based on a second attempt contact preference selected by the on-call user.

16 Claims, 11 Drawing Sheets

(51) Int. Cl.
*G06Q 10/06* (2012.01)
*G06F 11/07* (2006.01)

(58) Field of Classification Search
CPC .............. G06Q 10/103; G06Q 10/109; G06Q 10/1097; G06Q 10/1093
See application file for complete search history.

(56) References Cited

U.S. PATENT DOCUMENTS

| | | |
|---|---|---|
| 6,678,887 B1 | 1/2004 | Hallman |
| 6,816,898 B1 | 11/2004 | Scarpelli |
| 7,020,706 B2 | 3/2006 | Cates |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,689,628 B2 | 3/2010 | Garg |
| 7,716,353 B2 | 5/2010 | Golovinsky |
| 7,769,718 B2 | 8/2010 | Murley |
| 7,783,744 B2 | 8/2010 | Garg |
| 7,890,802 B2 | 2/2011 | Gerber |
| 7,925,981 B2 | 4/2011 | Pourheidari |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |
| 8,266,096 B2 | 9/2012 | Navarrete |
| 8,350,681 B2* | 1/2013 | Bells .................... G06Q 10/109 340/309.7 |
| 8,402,127 B2 | 3/2013 | Solin |
| 8,457,928 B2 | 6/2013 | Dang |
| 8,478,569 B2 | 7/2013 | Scarpelli |
| 8,612,408 B2 | 12/2013 | Trinon |
| 8,646,093 B2 | 2/2014 | Myers |
| 8,674,992 B2 | 3/2014 | Poston |
| 8,689,241 B2 | 4/2014 | Naik |
| 8,743,121 B2 | 6/2014 | De Peuter |
| 8,762,190 B1* | 6/2014 | Solomon ............ G06Q 10/1097 705/7.13 |
| 8,832,652 B2 | 9/2014 | Mueller |
| 8,887,133 B2 | 11/2014 | Behnia |
| 9,065,783 B2 | 6/2015 | Ding |
| 9,098,322 B2 | 8/2015 | Apte |
| 9,122,546 B1* | 9/2015 | Kaimal ................... G06F 9/542 |
| 9,122,552 B2 | 9/2015 | Whitney |
| 9,239,857 B2 | 1/2016 | Trinon |
| 9,247,525 B2* | 1/2016 | Jacobs ................. H04W 68/00 |
| 9,317,327 B2 | 4/2016 | Apte |
| 9,363,252 B2 | 6/2016 | Mueller |
| 9,467,970 B1* | 10/2016 | Kim ..................... H04L 67/1008 |
| 9,535,737 B2 | 1/2017 | Joy |
| 9,557,969 B2 | 1/2017 | Sharma |
| 9,645,833 B2 | 5/2017 | Mueller |
| 9,654,473 B2 | 5/2017 | Miller |
| 9,766,935 B2 | 9/2017 | Kelkar |
| 9,792,387 B2 | 10/2017 | George |
| 9,792,589 B2* | 10/2017 | Bedingfield, Sr. ... G06Q 10/109 |
| 9,805,322 B2 | 10/2017 | Kelkar |
| 11,055,980 B2* | 7/2021 | Mazar .................... G16H 40/63 |
| 11,109,757 B2* | 9/2021 | Mensinger ............. A61B 5/742 |
| 2001/0044840 A1* | 11/2001 | Carleton ............. H04L 43/0811 709/223 |
| 2003/0084150 A1* | 5/2003 | Hansen ............... H04L 41/0609 709/224 |
| 2009/0132662 A1* | 5/2009 | Sheridan ................ H04L 51/26 709/206 |
| 2009/0213852 A1* | 8/2009 | Krishnamurthi ........ H04L 51/34 370/389 |
| 2011/0087510 A1* | 4/2011 | Putra ................ G06Q 10/06311 705/7.13 |
| 2011/0298614 A1* | 12/2011 | Bells ..................... G06Q 10/109 340/539.13 |
| 2013/0275539 A1* | 10/2013 | Gross .................. H04L 12/1895 709/206 |
| 2014/0280657 A1* | 9/2014 | Miller .................... G06Q 30/02 709/207 |
| 2015/0033139 A1* | 1/2015 | Thiel .................... H04L 41/5074 715/740 |
| 2015/0066525 A1* | 3/2015 | Webb, III .............. G16H 80/00 705/2 |
| 2015/0189100 A1* | 7/2015 | Wang .................. H04M 19/041 455/414.1 |
| 2015/0242263 A1* | 8/2015 | Klose .................. G06F 11/0772 714/47.3 |
| 2015/0242264 A1* | 8/2015 | Vibhor ................... G06Q 10/00 714/57 |
| 2016/0248865 A1* | 8/2016 | Dotan-Cohen ......... H04L 67/26 |
| 2017/0083839 A1* | 3/2017 | Carpenter ........ G06Q 10/06395 |
| 2018/0308569 A1* | 10/2018 | Luellen ................. G16H 40/20 |
| 2019/0027018 A1* | 1/2019 | Corpus .................. G08B 29/04 |
| 2020/0320845 A1* | 10/2020 | Livny ................. H04L 63/1408 |

OTHER PUBLICATIONS

"Reducing MTTA: Escalation", VictorOps, Youtube.com, Mar. 22, 2019, https://www.youtube.com/watch?v=YxncEjyKv10 (Year: 2019).*
S. Winkler, H. Sonnberger and F. Bodendorf, "Escalation Management for the Monitoring of Critical Process and Project Activities," 2008 International Conference on Computational Intelligence for Modelling Control & Automation, 2008, pp. 889-894, doi: 10.1109/CIMCA.2008.141 (Year: 2008).*
Bhe et al. "Event Management and Best Practices", IBM Redbooks, Jun. 2004 http://www.redbooks.ibm.com/abstracts/sg246094.html?Open (Year: 2004).*

* cited by examiner

ON-CALL SCHEDULING AND ENHANCED CONTACT PREFERENCE MANAGEMENT

TECHNICAL FIELD

Embodiments described herein generally relate to cloud computing, and more particularly, to a user interface for creating and maintaining on-call schedules and providing enhanced contact preference management features to on-call users.

BACKGROUND

Cloud computing relates to sharing of computing resources that are generally accessed via the Internet. In particular, cloud computing infrastructure allows users to access a shared pool of computing resources, such as servers, storage devices, networks, applications, and/or other computing-based services. By doing so, users, such as individuals and/or enterprises, are able to access computing resources on demand that are located at remote locations in order to perform a variety of computing functions that include storing and/or processing computing data. For enterprise and other organization users, cloud computing provides flexibility in accessing cloud computing resources without accruing up-front costs, such as purchasing network equipment and investing time in establishing a private network infrastructure. Instead, by utilizing cloud computing resources, users are able redirect their resources to focus on core enterprise functions.

In today's communication networks, examples of cloud computing services a user may utilize include software as a service (SaaS) and platform as a service (PaaS) technologies. SaaS is a delivery model that provides software as a service rather than an end product. Instead of utilizing local network or individual software installations, software is typically licensed on a subscription basis, hosted on a remote machine, and accessed as needed. For example, users are generally able to access a variety of enterprise and/or information technology (IT) related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions. To minimize downtime of software services for enterprise operations made available via the cloud-based developmental platform, it may be desirable to ensure that a dedicated support team member is always available to resolve any issues that may arise.

SUMMARY

The following presents a simplified summary of the disclosed subject matter in order to provide a basic understanding of some aspects of the subject matter disclosed herein. This summary is not an exhaustive overview of the technology disclosed herein. It is not intended to identify key or critical elements of the invention or to delineate the scope of the invention. Its sole purpose is to present some concepts in a simplified form as a prelude to the more detailed description that is discussed later.

In one embodiment a method for on-call scheduling, comprising: setting based on user operation, scheduling information for each of a plurality of shifts of an on-call schedule at design-time within an on-call scheduling user interface, the scheduling information including an escalation path graphical outline having at least one escalation step element and a corresponding wait duration element; executing an escalation path associated with a current one of the plurality of shifts of the on-call schedule at run-time in response to a predetermined condition being satisfied; and notifying an on-call user associated with the current one of the plurality of shifts based on the escalation path, wherein the escalation path is configured to make a first notification attempt to notify the on-call user based on a first attempt contact preference selected by the on-call user, and make a second notification attempt to notify the on-call user based on a second attempt contact preference selected by the on-call user.

In another embodiment, the method may be embodied in computer executable program code and stored in a non-transitory storage device. In yet another embodiment, the method may be implemented on a computer system.

BRIEF DESCRIPTION OF DRAWINGS

For a more complete understanding of this disclosure, reference is now made to the following brief description, taken in connection with the accompanying drawings and detailed description, wherein like reference numerals represent like parts.

DESCRIPTION OF EMBODIMENTS

Figure 1:
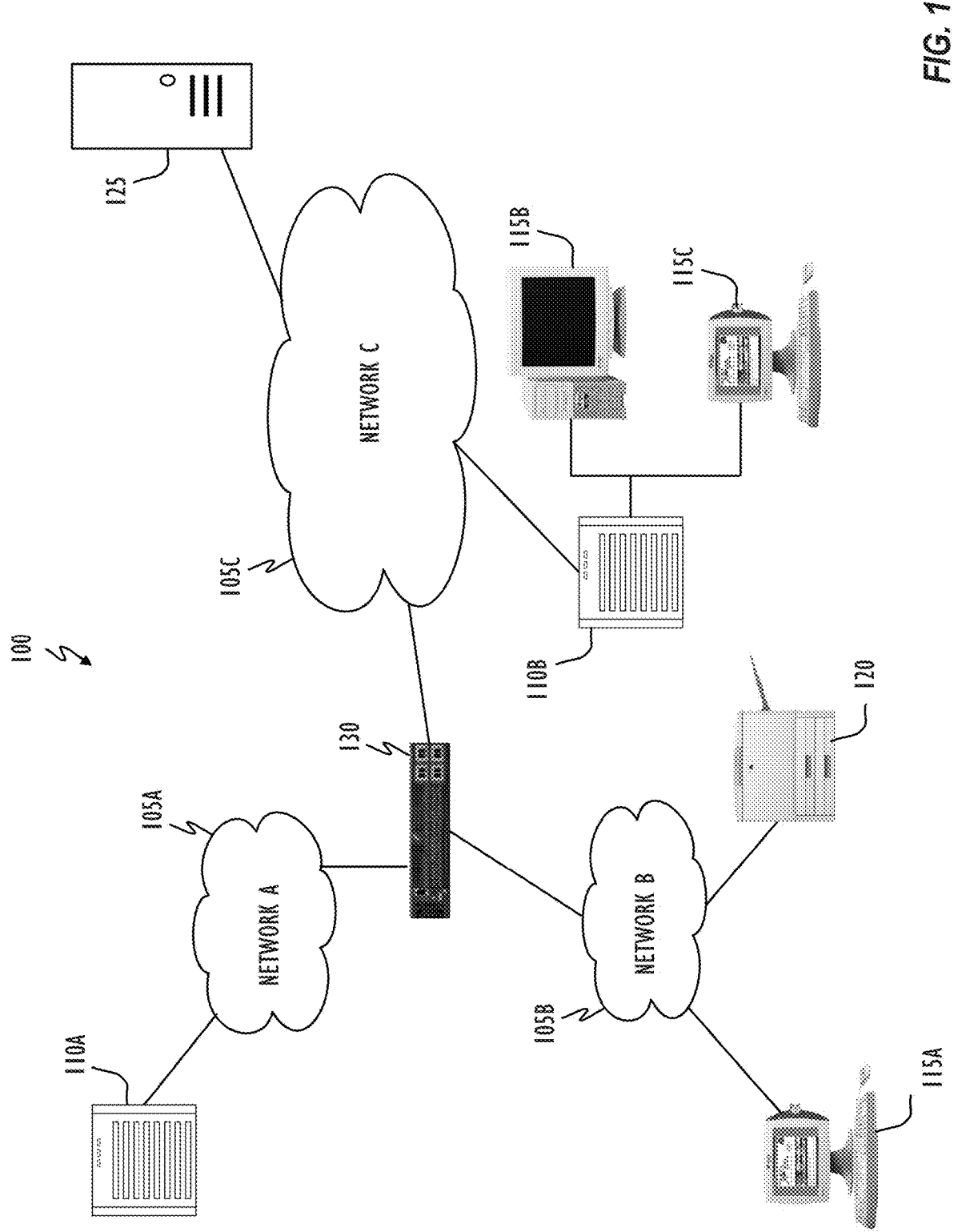
FIG. 1 illustrates a block diagram of a self-hosted network system where one or more embodiments of the present disclosure may operate.

In the following description, for purposes of explanation, numerous specific details are set forth in order to provide a thorough understanding of the embodiments disclosed herein. It will be apparent, however, to one skilled in the art that the disclosed embodiments may be practiced without these specific details. In other instances, structure and devices are shown in block diagram form in order to avoid obscuring the disclosed embodiments. Moreover, the language used in this disclosure has been principally selected for readability and instructional purposes, and may not have been selected to delineate or circumscribe the inventive subject matter, resorting to the claims being necessary to determine such inventive subject matter. Reference in the specification to "one embodiment" or to "an embodiment" means that a particular feature, structure, or characteristic described in connection with the embodiments is included in at least one embodiment.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

The term "computing system" is generally taken to refer to at least one electronic computing device that includes, but is not limited to a single computer, virtual machine, virtual container, host, server, laptop, and/or mobile device or to a plurality of electronic computing devices working together to perform the function described as being performed on or by the computing system.

As used herein, the term "medium" refers to one or more non-transitory physical media that together store the contents described as being stored thereon. Embodiments may include non-volatile secondary storage, read-only memory (ROM), and/or random-access memory (RAM).

As used herein, the term "application" refers to one or more computing modules, programs, processes, workloads, threads and/or a set of computing instructions executed by a computing system. Example embodiments of an application include software modules, software objects, software instances and/or other types of executable code.

This disclosure pertains to an on-call scheduling user interface allowing users to create, modify, manage, preview, and execute on-call schedules that enable an enterprise to ensure availability of dedicated support team members (e.g., on-call members, on-call users, on-call technicians, and the like) at all times to resolve any issue (e.g., escalations, incidents, failures, and the like in components, systems, processes, and logical or functional units of an enterprise) as they arise, thereby reducing downtime for software services or other functions or processes of the enterprise managed through a cloud-based development platform. Techniques disclosed herein also look to enable support team members to configure where and when they will be notified (including any subsequent reminder notifications) when an on-call escalation path is executed. In one embodiment, a contact preference management user interface may allow on-call members added to an on-call schedule by an on-call manager (e.g., supervisor) to configure or select contact preferences (e.g., email, SMS, voice, Push, Slack, device preferences, and the like) to receive notifications (and any subsequent reminders) on their preferred devices so that the number of unacknowledged escalations can be reduced.

An on-call schedule may be created or set by a user (e.g., on-call manager) using the on-call scheduling user interface. The on-call schedule may be associated with one or more core component, resource or process (e.g., hardware, network, database, and the like) of the enterprise, or may be associated with a logical or functional construct or unit (e.g., major incident management, service desk, application development, and the like) related to the enterprise. Once the on-call schedule is saved and activated, a trigger event corresponding to the on-call schedule may occur and a corresponding escalation path of a corresponding shift (e.g., time period out of 24×7 on-call coverage) may be executed to notify corresponding and current on-call members based on individualized contact preferences set by the on-call members.

Based on user operation (e.g., on-call manager having supervisory responsibility to create, and manage on-call schedules for the enterprise), scheduling information and calendar information for each of a plurality of shifts (e.g., three shifts of 8 hours each for weekdays, and separate additional shifts for weekends or holidays) may be set to create the on-call schedule. The on-call schedule may be newly created from scratch or may be created from an existing template including pre-defined plurality of shifts. The scheduling information set by the user may include member information regarding one or more groups or rosters (e.g., primary, secondary, and the like) of users (e.g. on-call members) that are on-call for a given shift of the on-call schedule. The scheduling information for each shift may further include one or more escalation paths that include one or more escalation steps that specify one or more users of one or more groups and/or individual on-call members that are to be notified (and the order in which they are notified including reminder notifications until an acknowledgement is received by the system) based on corresponding contact preferences of the users and corresponding wait duration (e.g., time duration, delay, and the like) when the escalation path is executed.

The on-call scheduling user interface may concurrently display for the plurality of shifts the scheduling information and calendar information showing a coverage period of the shift at design-time. Once the on-call schedule is saved by the user (e.g., on-call manager), the on-call schedule may be activated and may run as an automated process in the background (e.g., flow plan, enterprise rule, enterprise logic, script includes, scheduled job, and the like). A trigger event corresponding to the activated on-call schedule may occur when a predetermined condition (e.g., creation of predetermined type of incident, task type, urgency, or other predetermined field of an incident or task record is updated) is satisfied, and this may result in execution a corresponding escalation path. Alternately, the trigger event for the on-call schedule may be manually created by a user (e.g., adding a group of users to a conference call). Upon execution, the escalation path may be configured to consume contact preferences (e.g., email, voice call, text message, Slack, Push notification, device preferences, the like) previously specified by the current on-call user of the corresponding group to thereby notify the on-call member based on the contact preference selected by the user. For example, a first attempt to notify the on-call user may be made via a first selected device and/or a first selected communication channel (i.e., first attempt contact preference), and when the first notification remains unacknowledged for a time duration specified by the escalation path, a subsequent second attempt to notify the on-call user may be made via a second selected device and/or a second selected communication channel (i.e., second attempt contact preference). The on-call schedule may also enable the on-call manager to override contact preferences set by the on-call user based on a type of the trigger event (e.g., high-priority incident or task). As a result, the system may notify an on-call user, send subsequent reminders to the user, and/or subsequently notify other on-call users based on predetermined 'default' contact information for the users without regard to the users' individualized contact preferences. The 'default' contact information for on-call users may be set by an on-call manager, or may be set by a system administrator. The system thereby reduces the number of unacknowledged escalations and/or overall time taken from when a trigger event for an on-call schedule occurs to when a notification attempt is acknowledged by an appropriate on-call member.

FIG. 1 depicts an illustrative self-hosted network system 100 where one or more embodiments of the present disclosure may operate. This illustrative network system 100 may include a plurality of networks 105, (i.e., 105A, 105B, and 105C), each of which may take any form including, but not limited to, a local area network (LAN) or a WAN, such as the Internet. Further, networks 105 may use any desired technology (wired, wireless, or a combination thereof) and protocol (e.g., transmission control protocol, TCP). Coupled to networks 105 are data server computers 110 (i.e., 110A and 110B) that are capable of operating server applications such as databases and also capable of communicating over networks 105. One embodiment using server computers may involve the operation of one or more central systems to log user session data and identify session signatures of the user session.

Client computers 115 (i.e., 115A, 115B, and 115C), which may take the form of any smartphone, gaming system, tablet, computer, set top box, entertainment device/system, television, telephone, communications device, or intelligent machine, including embedded systems, may also be coupled to networks 105, and/or data server computers 110. In some embodiments, network system 100 may also include network printers such as printer 120 and storage systems such as 125, which may be used to store user session data or other data that are referenced herein. To facilitate communication between different network devices (e.g., data servers 110, end-user computers 115, network printer 120, and storage system 125), at least one gateway or router 130 may be optionally coupled there between. Furthermore, in order to facilitate such communication, each device employing the network may comprise a network adapter circuit and related software. For example, if an Ethernet network is desired for communication, each participating device must have an Ethernet adapter or embedded Ethernet capable ICs. Further, the devices may carry network adapters for any network in which they might participate (including, but not limited to, personal area networks (PANs), LANs, WANs, and cellular networks).

Figure 2:
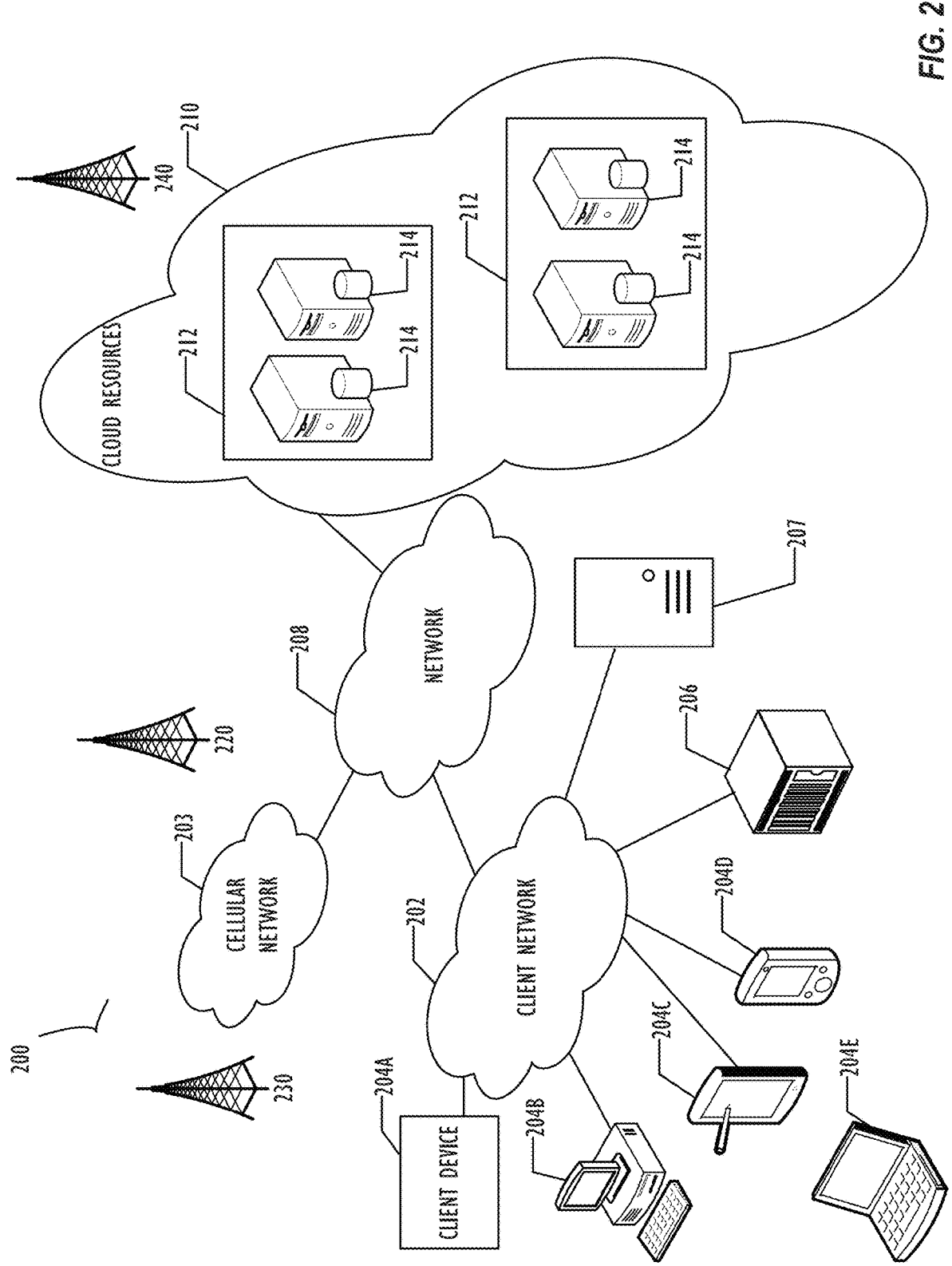
FIG. 2 illustrates a block diagram of a cloud computing infrastructure where one or more embodiments of the present disclosure may operate.

FIG. 2 illustrates a block diagram of an embodiment of a cloud computing infrastructure 200 where one or more embodiments of the present disclosure may operate. Cloud computing infrastructure 200 comprises a client network 202, network 208, and a cloud resources platform/network 210. In one embodiment, the client network 202 may be a local private network such as LAN that includes a variety of network devices that include, but are not limited to switches, servers, and routers. Each of these networks can contain wired or wireless programmable devices and operate using any number of network protocols (e.g., TCP/IP) and connection technologies (e.g., Wi-Fi® networks, Bluetooth®). Wi-Fi is a registered trademark of the Wi-Fi Alliance. Bluetooth is a registered trademark of Bluetooth Special Interest Group. In another embodiment, client network 202 represents an enterprise network that could include or be communicatively coupled to one or more local area networks (LANs), virtual networks, data centers and/or other remote networks (e.g., 208, 210). As shown in FIG. 2, client network 202 may be connected to one or more client devices 204A-E and allow the client devices to communicate with each other and/or with cloud resources platform/network 210. Client devices 204A-E may be computing systems such as desktop computer 204B, tablet computer 204C, mobile phone 204D, laptop computer (shown as wireless) 204E, and/or other types of computing systems generically shown as client device 204A. Each of client devices 204A-E may be similar to any of client computers 115 of network system 100 shown in FIG. 1. FIG. 2 also illustrates that client network 202 may be connected to a local compute resource 206 that may include a server, access point, router, or other device configured to provide for local computational resources and/or to facilitate communication amongst networks and devices. For example, local compute resource 206 may be one or more physical local hardware devices configured to communicate with wireless network devices and/or facilitate communication of data between client network 202 and other networks such as network 208 and cloud resources platform/network 210. Local compute resource 206 may also facilitate communication between other external applications, data sources, and services, and client network 202.

FIG. 2 also illustrates that client network 202 may be connected to a computer configured to execute a management, instrumentation, and discovery (MID) server 207. For example, MID server 207 may be a Java® application that runs as a Windows® service or UNIX® daemon. Java is a registered trademark of Oracle America, Inc. Windows is a registered trademark of Microsoft Corporation. UNIX is a registered trademark of The Open Group. MID server 207 may be configured to assist functions such as, but not necessarily limited to, discovery, orchestration, service mapping, service analytics, and event management. MID server 207 may be configured to perform tasks for a cloud-based instance while never initiating communication directly to the cloud-instance by utilizing a work queue architecture. This configuration may assist in addressing security concerns by eliminating that path of direct communication initiation.

Cloud computing infrastructure 200 also includes cellular network 203 for use with mobile communication devices. Mobile cellular networks support mobile phones and many other types of mobile devices such as laptops etc. Mobile devices in cloud computing infrastructure 200 are illustrated as mobile phone 204D, laptop 204E, and tablet 204C. A mobile device such as mobile phone 204D may interact with one or more mobile provider networks as the mobile device moves, typically interacting with a plurality of mobile network towers 220, 230, and 240 for connecting to the cellular network 203. Although referred to as a cellular network in FIG. 2, a mobile device may interact with towers of more than one provider network, as well as with multiple non-cellular devices such as wireless access points and routers (e.g., local compute resource 206). In addition, the mobile devices may interact with other mobile devices or with non-mobile devices such as desktop computer 204B and various types of client device 204A for desired services. Although not specifically illustrated in FIG. 2, client network 202 may also include a dedicated network device (e.g., gateway or router) or a combination of network devices that implement a customer firewall or intrusion protection system.

FIG. 2 illustrates that client network 202 is coupled to a network 208. Network 208 may include one or more computing networks, such as other LANs, wide area networks (WANs), the Internet, and/or other remote networks, in order to transfer data between client devices 204A-E and cloud resources platform/network 210. Each of the computing networks within network 208 may contain wired and/or wireless programmable devices that operate in the electrical and/or optical domain. For example, network 208 may include wireless networks, such as cellular networks in addition to cellular network 203. Wireless networks may utilize a variety of protocols and communication techniques (e.g., Global System for Mobile Communications (GSM) based cellular network) wireless fidelity Wi-Fi networks, Bluetooth, Near Field Communication (NFC), and/or other suitable radio-based networks as would be appreciated by one of ordinary skill in the art upon viewing this disclosure. Network 208 may also employ any number of network communication protocols, such as Transmission Control Protocol (TCP) and Internet Protocol (IP). Although not explicitly shown in FIG. 2, network 208 may include a variety of network devices, such as servers, routers, network switches, and/or other network hardware devices configured to transport data over networks.

In FIG. 2, cloud resources platform/network 210 is illustrated as a remote network (e.g., a cloud network) that is able to communicate with client devices 204A-E via client network 202 and network 208. The cloud resources platform/network 210 acts as a platform that provides additional computing resources to the client devices 204A-E and/or client network 202. For example, by utilizing the cloud resources platform/network 210, users of client devices 204A-E may be able to build and execute applications, such as automated processes for various enterprise, IT, field service and/or other organization-related functions. In one embodiment, the cloud resources platform/network 210 includes one or more data centers 212, where each data center 212 could correspond to a different geographic location. Within a particular data center 212 a cloud service provider may include a plurality of server instances 214. Each server instance 214 may be implemented on a physical computing system, such as a single electronic computing device (e.g., a single physical hardware server) or could be in the form of a multi-computing device (e.g., multiple physical hardware servers). Examples of server instances 214 include, but are not limited to, a web server instance (e.g., a unitary Apache® installation), an application server instance (e.g., unitary Java Virtual Machine), and/or a database server instance (e.g., a unitary MySQL® catalog). Apache is a registered trademark of Apache Software Foundation. MySQL is a registered trademark of MySQL AB.

To utilize computing resources within cloud resources platform/network 210, network operators may choose to configure data centers 212 using a variety of computing infrastructures. In one embodiment, one or more of data centers 212 are configured using a multi-tenant cloud architecture such that a single server instance 214, which can also be referred to as an application instance, handles requests and serves more than one customer. In some cases, data centers with multi-tenant cloud architecture commingle and store data from multiple customers, where multiple client instances are assigned to a single server instance 214. In a multi-tenant cloud architecture, the single server instance 214 distinguishes between and segregates data and other information of the various customers. For example, a multi-tenant cloud architecture could assign a particular identifier for each customer in order to identify and segregate the data from each customer. In a multitenancy environment, multiple customers share the same application, running on the same operating system, on the same hardware, with the same data-storage mechanism. The distinction between the customers is achieved during application design, thus customers do not share or see each other's data. This is different than virtualization where components are transformed, enabling each customer application to appear to run on a separate virtual machine. Generally, implementing a multi-tenant cloud architecture may have a production limitation, such as the failure of a single server instance 214 causing outages for all customers allocated to the single server instance 214.

In another embodiment, one or more of the data centers 212 are configured using a multi-instance cloud architecture to provide every customer its own unique client instance. For example, a multi-instance cloud architecture could provide each client instance with its own dedicated application server and dedicated database server. In other examples, the multi-instance cloud architecture could deploy a single server instance 214 and/or other combinations of server instances 214, such as one or more dedicated web server instances, one or more dedicated application server instances, and one or more database server instances, for each client instance. In a multi-instance cloud architecture, multiple client instances could be installed on a single physical hardware server where each client instance is allocated certain portions of the physical server resources, such as computing memory, storage, and processing power. By doing so, each client instance has its own unique software stack that provides the benefit of data isolation, relatively less downtime for customers to access the cloud resources platform/network 210, and customer-driven upgrade schedules. An example of implementing a client instance within a multi-instance cloud architecture will be discussed in more detail below when describing FIG. 3.

Figure 3:
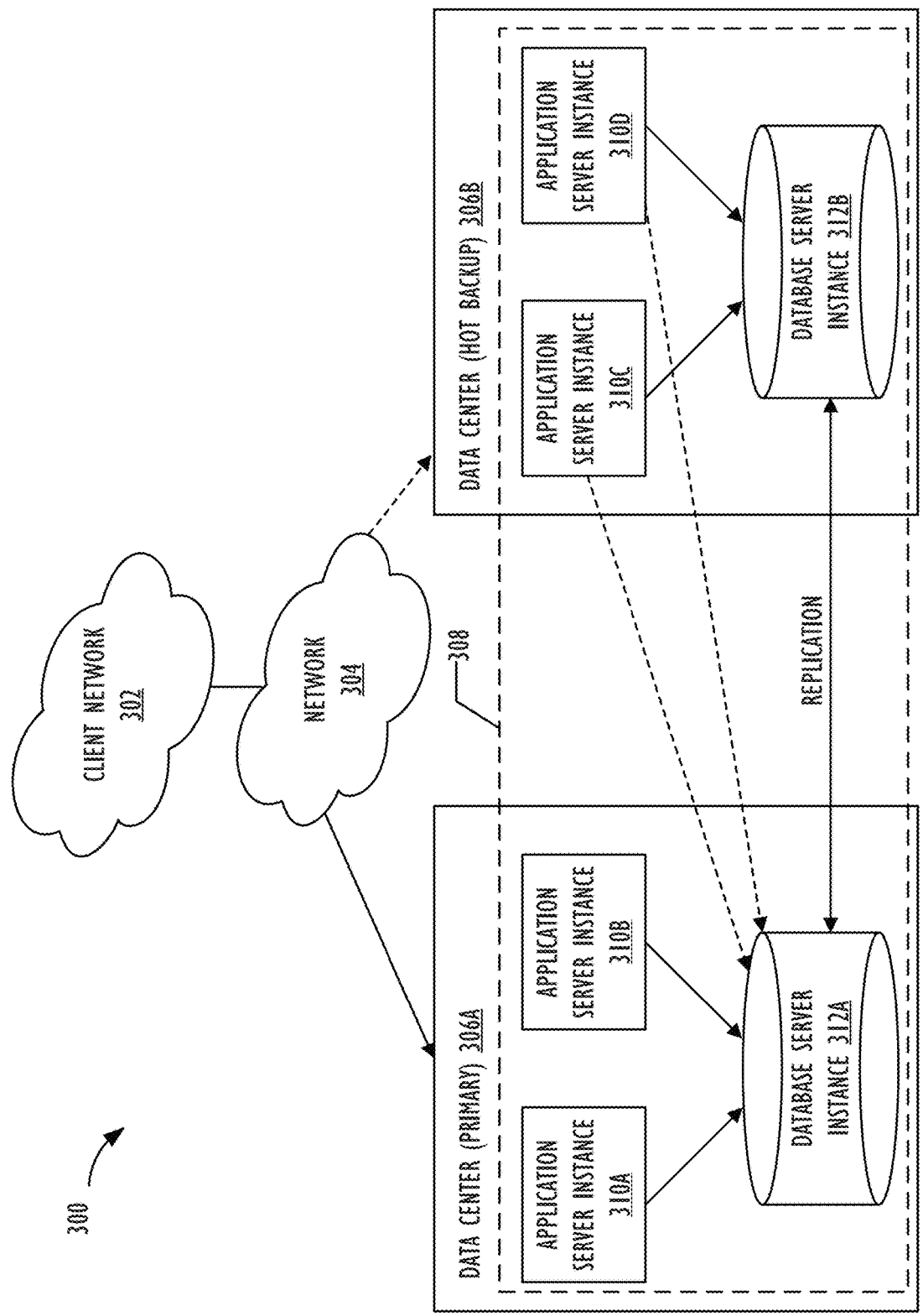
FIG. 3 illustrates a block diagram of a multi-instance cloud architecture where one or more embodiments of the present disclosure may operate.

In one embodiment, utilizing a multi-instance cloud architecture, a first client instance may be configured with a client-side application interface such as, for example, a web browser executing on a client device (e.g., one of client devices 204A-E of FIG. 2). FIG. 3 illustrates a block diagram of an embodiment of a multi-instance cloud architecture 300 where embodiments of the present disclosure may operate. FIG. 3 illustrates that the multi-instance cloud architecture 300 includes a client network 302 that connects to two data centers 306A and 306B via network 304. Client network 302 and network 304 may be substantially similar to client network 302 and network 208 as described in FIG. 2, respectively. Data centers 306A and 306B can correspond to FIG. 2's data centers 212 located within cloud resources platform/network 210. Using FIG. 3 as an example, a client instance 308 is composed of four dedicated application server instances 310A-310D and two dedicated database server instances 312A and 312B. Stated another way, the application server instances 310A-310D and database server instances 312A and 312B are not shared with other client instances 308. Other embodiments of multi-instance cloud architecture 300 could include other types of dedicated server instances, such as a web server instance. For example, client instance 308 could include the four dedicated application server instances 310A-310D, two dedicated database server instances 312A and 312B, and four dedicated web server instances (not shown in FIG. 3).

To facilitate higher availability of client instance 308, application server instances 310A-310D and database server instances 312A and 312B are shown to be allocated to two different data centers 306A and 306B, where one of data centers 306 may act as a backup data center. In reference to FIG. 3, data center 306A acts as a primary data center that includes a primary pair of application server instances 310A and 310B and primary database server instance 312A for client instance 308, and data center 306B acts as a secondary data center to back up primary data center 306A for client instance 308. To back up primary data center 306A for client instance 308, secondary data center 306B includes a secondary pair of application server instances 310C and 310D and a secondary database server instance 312B. Primary database server instance 312A is able to replicate data to secondary database server instance 312B. As shown in FIG. 3, primary database server instance 312A replicates data to secondary database server instance 312B using a replication operation such as, for example, a Master-Master MySQL Binlog replication operation. The replication of data between data centers could be implemented in real time or by implementing full backup weekly and daily incremental backups in both data centers 306A and 306B. Having both a primary data center 306A and secondary data center 306B allows data traffic that typically travels to the primary data center 306A for client instance 308 to be diverted to secondary data center 306B during a failure and/or maintenance scenario. Using FIG. 3 as an example, if application server instances 310A and 310B and/or primary data server instance 312A fail and/or are under maintenance, data traffic for client instance 308 can be diverted to secondary application server instances 310C and 310D and secondary database server instance 312B for processing.

Although FIGS. 2 and 3 illustrate specific embodiments of cloud computing system 200 and multi-instance cloud architecture 300, respectively, the disclosure is not limited to the specific embodiments illustrated in FIGS. 2 and 3. For example, although FIG. 2 illustrates that cloud resources platform/network 210 is implemented using data centers, other embodiments of the cloud resources platform/network 210 are not limited to data centers and can utilize other types of remote network infrastructures. Moreover, other embodiments of the present disclosure may combine one or more different server instances into a single server instance. Using FIG. 3 as an example, application server instances 310 and database server instances 312 can be combined into a single server instance. The use and discussion of FIGS. 1-3 are only exemplary to facilitate ease of description and explanation.

Figure 4:
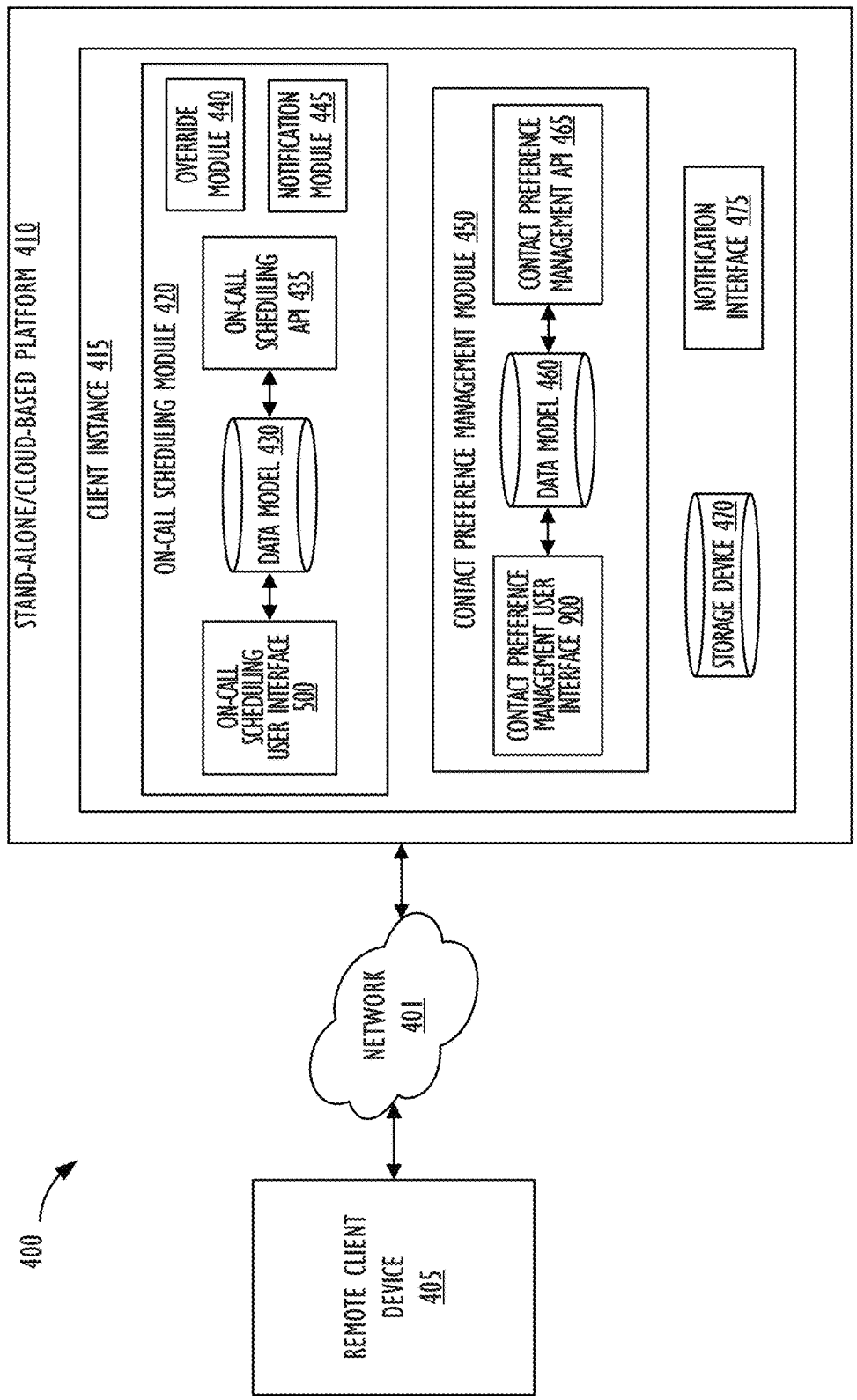
FIG. 4 illustrates a block diagram of an embodiment of an on-call scheduling system.

FIG. 4 illustrates a block diagram of on-call scheduling system 400 where one or more embodiments of the present disclosure may operate. As shown in FIG. 4, on-call scheduling system 400 may include remote client device 405 and cloud-based platform 410 that are communicatively coupled to each other through network 401. Remote client device 405 may be substantially similar to any of client computers 115, as described in FIG. 1, and client devices 204A-E, as described in FIG. 2. Network 401 may be substantially similar to any of the plurality of networks 105, as described in FIG. 1, and client network 202 and network 208, as described in FIG. 2. Detailed description of remote client device 405 and network 401 is omitted here. Further, cloud-based platform 410 may be substantially similar to cloud resources platform/network 210 described in FIG. 2, and cloud-based platform 410 may include one or more client instances 415. Client instance 415 may be substantially similar to client instance 308, as described in FIG. 3. Although the embodiment shown in FIG. 4 illustrates client instance 415 deployed on cloud-based platform 410, this may not necessarily be the case. That is, client instance 415 may be hosted on self-hosted network system 100, as described in FIG. 1, or on cloud resources platform/network 210, as described in FIG. 2. Client instance 415 may be accessible by a user of remote client device 405 via network 401 through an application interface such as, for example, a graphical user interface (GUI) or a web browser executing on remote client device 405, in order to access software applications, services, and data deployed on client instance 415.

Client instance 415 may include on-call scheduling module 420, contact preference management module 450, storage device 470, and notification interface 475. Client instance 415 may act as a hosted client instance platform for deploying various enterprise and/or IT related software applications and related enterprise data on a relational database. The enterprise data may be stored in storage device 470 and may correspond to data of a plurality of rows (or records) of a plurality of tables of the database. The database may be updated in real-time as a user interacts with (e.g., insert, update, delete a record in a table) client instance 415. The software applications hosted on client instance 415 may provide coverage in one or more capability areas of the enterprise such as IT, IT support, security, customer service, technical support, e-mail, backup and storage, HR, finance, legal, marketing, sales, compliance, and governance. For example, the software applications may include components related to the following applications and modules of the enterprise: IT Service Management, Incident Management, Problem Management, Change and Release Management, Benchmarks, Cost Management, Request Management, Configuration Management Database, Asset Management, Service Catalog, Knowledge Management, Survey and Assessment, Service Level Management, IT Operations Management, Discovery, Cloud Management, Event Management, Orchestration, Service Mapping, Operational Intelligence, IT Business Management, Project Portfolio Management, Demand Management, Resource Management, Agile Development, Application Portfolio Management, Cost Transparency, Financial Planning, Financial Reporting, Performance Analytics, Software Asset Management, Security, Security Operations, Governance, Risk and Compliance, Customer Service, Customer Service Management, Field Service Management, Knowledge Management, HR Service Delivery, Case and Knowledge Management, Employee Service Center, Employee Onboarding and Transitions.

On-call scheduling module 420 may include on-call scheduling user interface 500 (FIGS. 5-8), data model 430, on-call scheduling APIs 435, override module 440, and notification module 445. On-call scheduling module 420 provides on cloud-based platform 410, the functionality for creating, modifying, previewing, managing, triggering, and executing a plurality of on-call schedules to ensure timely notification to appropriate users in a predefined escalation order for resolution of issues associated with client instance 415 as and when they arise, and minimize downtime of components, processes, and/or logical or functional units of the enterprise associated with client instance 415. On-call scheduling module 420 may be a globally scoped application that supports application scoping and may be provided out of the box on client instance 415. On-call scheduling module 420 may provide a way to determine which member of a user group is available to complete a task or handle an issue at a given time, for example, to find the right person to assign an incident. On-call positions can be regularly rotated among some or all members of a group of users (e.g., on-call members) assigned to one or more time shifts of an on-call schedule.

In one embodiment, design-time implementation of an on-call schedule can be done through standard platform forms and lists via on-call scheduling user interface 500. On-call scheduling module 420 may be created using any suitable programming language (e.g., Java®) and database management system including one or more relational database tables. In one embodiment, on-call scheduling module 420 may be implemented based on a user completing and saving an on-call schedule form or wizard with field values via on-call scheduling user interface 500, calling a Java API that interfaces with a database to create data model 430 corresponding to the completed and saved on-call schedule form or wizard, and providing one or more on-call scheduling APIs 435 for interacting with consumers of the created and saved on-call schedules and interacting with other modules (e.g., notification module 445, contact preference management module 450, and the like) deployed on client instance 415 or on other parts of cloud-based platform 410.

On-call scheduling user interface 500 may include standard platform forms and lists, custom user interfaces, and other graphical elements (e.g., calendar preview, escalation path graphical outlines, on-call schedule creation wizard, graphical elements, and the like) for enabling a user with appropriate privileges (e.g., enterprise decision maker or on-call schedule manager) to create, update, activate/deactivate, delete, preview, execute, and/or manage on-call schedules. For example, on-call schedule user interface 500 may enable a user of remote client device 405 to create an on-call schedule and set or input corresponding scheduling information (e.g., on-call schedule name, one or more shifts of the on-call schedule, shift name for each created shift, shift time period or time/day slot for each created shift, one or more members of one or more groups assigned to each of the one or more shifts, one or more escalation paths for on-call escalation for each shift, and the like), and preview the set scheduling information and corresponding generated calendar information showing a coverage period of each of the defined time shifts of the on-call schedule, and current on-call members from each of the created one or more member groups (for active on-call schedules).

In one embodiment, on-call scheduling user interface 500 may be located on a client device that receives user input. On-call scheduling API 435 (e.g., Java API, REST API, and the like) may receive as input contact preferences of on-call members of one or more groups defined in the on-call schedule and return notification or reminder attempt data to notification module 445 so that on-call escalations may be notified to on-call members via notification interface 475 based on the corresponding set escalation path (e.g., escalation policy, escalation plan, on-call escalation, and the like) of the on-call schedule and consistent with the received contact preferences of the on-call members. On-call scheduling module 420 may further include override module 440 to override contact preferences of on-call members during execution of a particular escalation path based on information regarding the trigger event (e.g., critical or high-priority incident) associated with the on-call schedule.

On-call scheduling API 435 may also include additional API points for retrieving all active on-call schedules, as well as getting all details about a single on-call schedule including shift times, member groups, rosters, and corresponding on-call members that are regularly rotated within each group for the time shifts, escalation path details for the time shifts, current on-call members from each group for a current time shift, corresponding contact preferences for one or more notification attempts, escalation path details for the current time shift, and the like. In one embodiment, on-call scheduling API 435 may be a REST API so various automated processes (e.g., flow plan or flow, enterprise rules, and the like) can integrate and consume the on-call schedules. Example use cases of on-call schedules (and corresponding set scheduling information) created by a user with on-call scheduling user interface 500 are shown in FIGS. 5-8.

Figure 5:
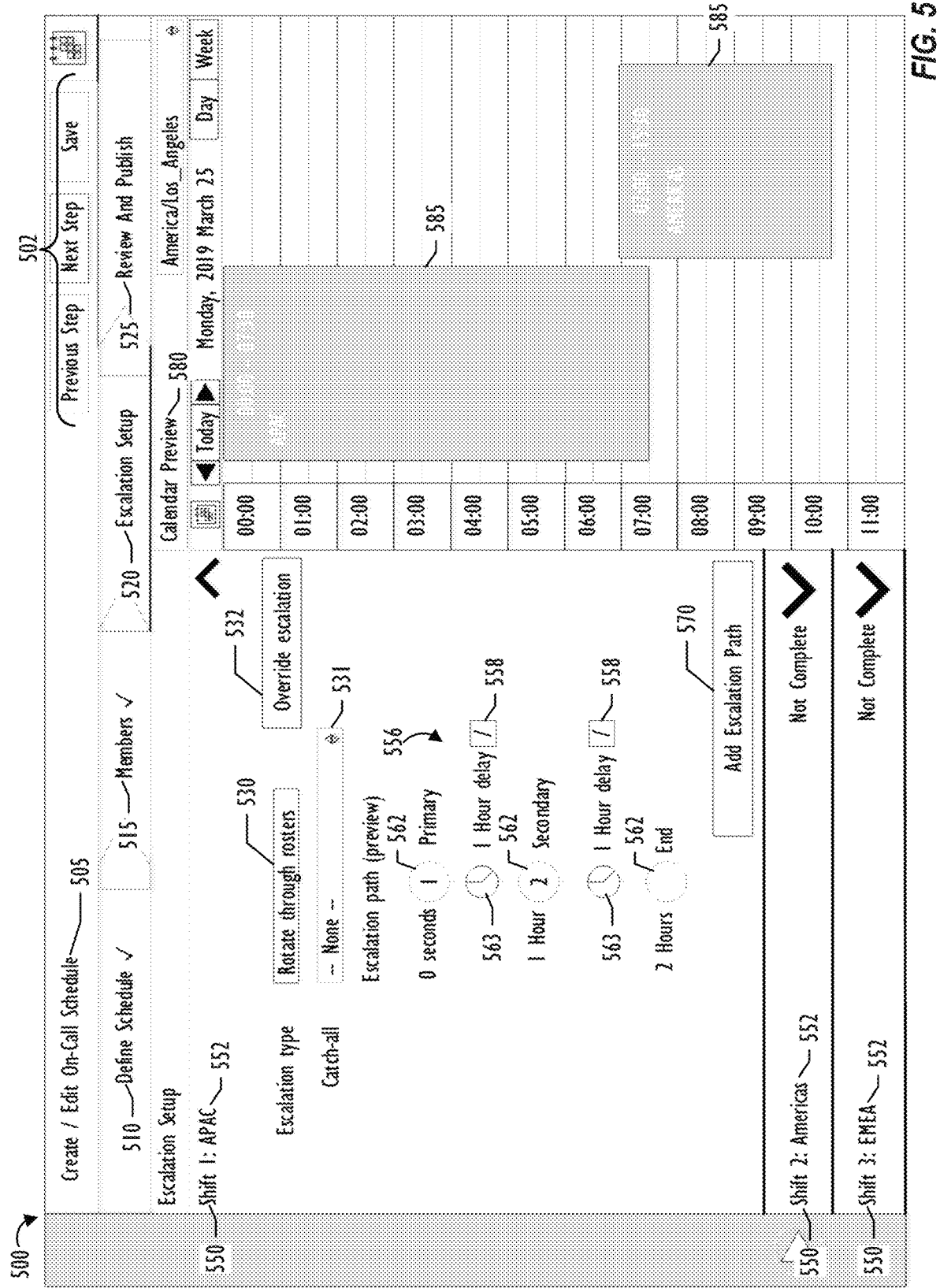
FIG. 5 illustrates an embodiment of an on-call schedule a user can create or modify with the on-call scheduling user interface.

As shown in FIGS. 5-8, on-call scheduling user interface 500 permits a user to create, modify, manage, preview, and save (e.g., activate, publish) on-call schedules. FIG. 5 illustrates an exemplary on-call schedule 505 a user can create or modify with on-call scheduling user interface 500 in accordance with one or more embodiments. As shown in FIG. 5, on-call scheduling user interface 500 enables a user (e.g., on-call manager or decision maker) to create a new on-call schedule 505 by interacting with on-call scheduling user interface 500 and setting desired scheduling information. For example, the user may interact with on-call scheduling user interface 500 to complete a plurality of steps 510-525 of an on-call schedule creation wizard. Step 510 may involve defining a schedule by selecting or setting a plurality of time shifts (i.e., scheduling information) for on-call schedule 505. The time shifts may correspond to time slots (e.g., predetermined time periods, coverage periods) that repeat on a predetermined basis. For example, if the enterprise associated with client instance 315 wants coverage around the clock, the time shifts would cover a 24-7 schedule. As another example, if the enterprise provides support around the globe, the time shifts could use a 'follow the sun' schedule to cover different time zones across different continents. Step 510 may allow the user to create new time shifts for on-call schedule 505. Alternately, on-call scheduling user interface 500 at step 510 may allow the user to select from pre-existing templates to automatically define (pre-populate) a plurality of shifts (including, e.g., shift names, shift hours or time slots, and the like).

Figure 6:
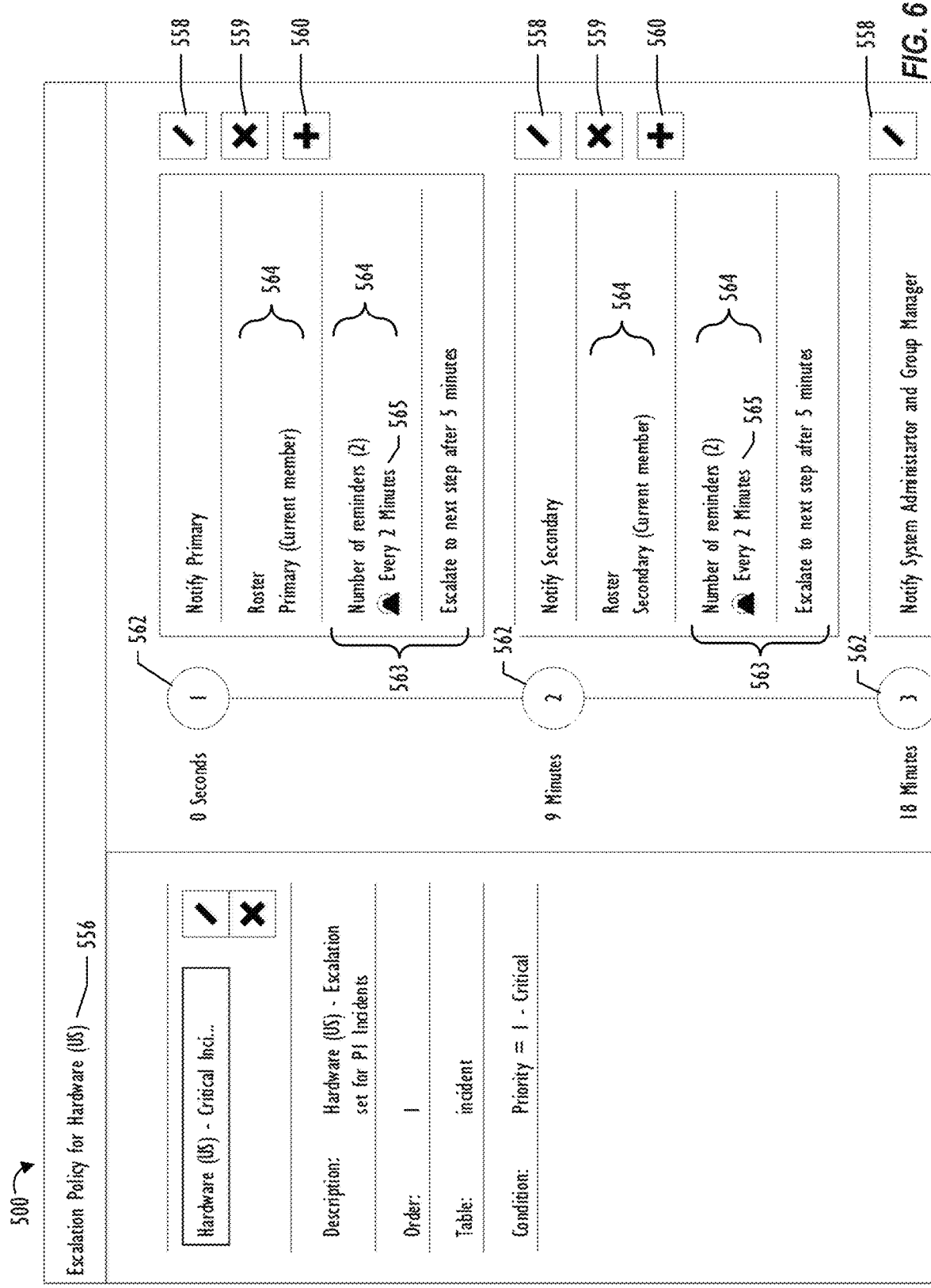
FIG. 6 illustrates an embodiment of an escalation path of an on-call schedule a user can set for critical incidents with the on-call scheduling user interface.
Figure 7:
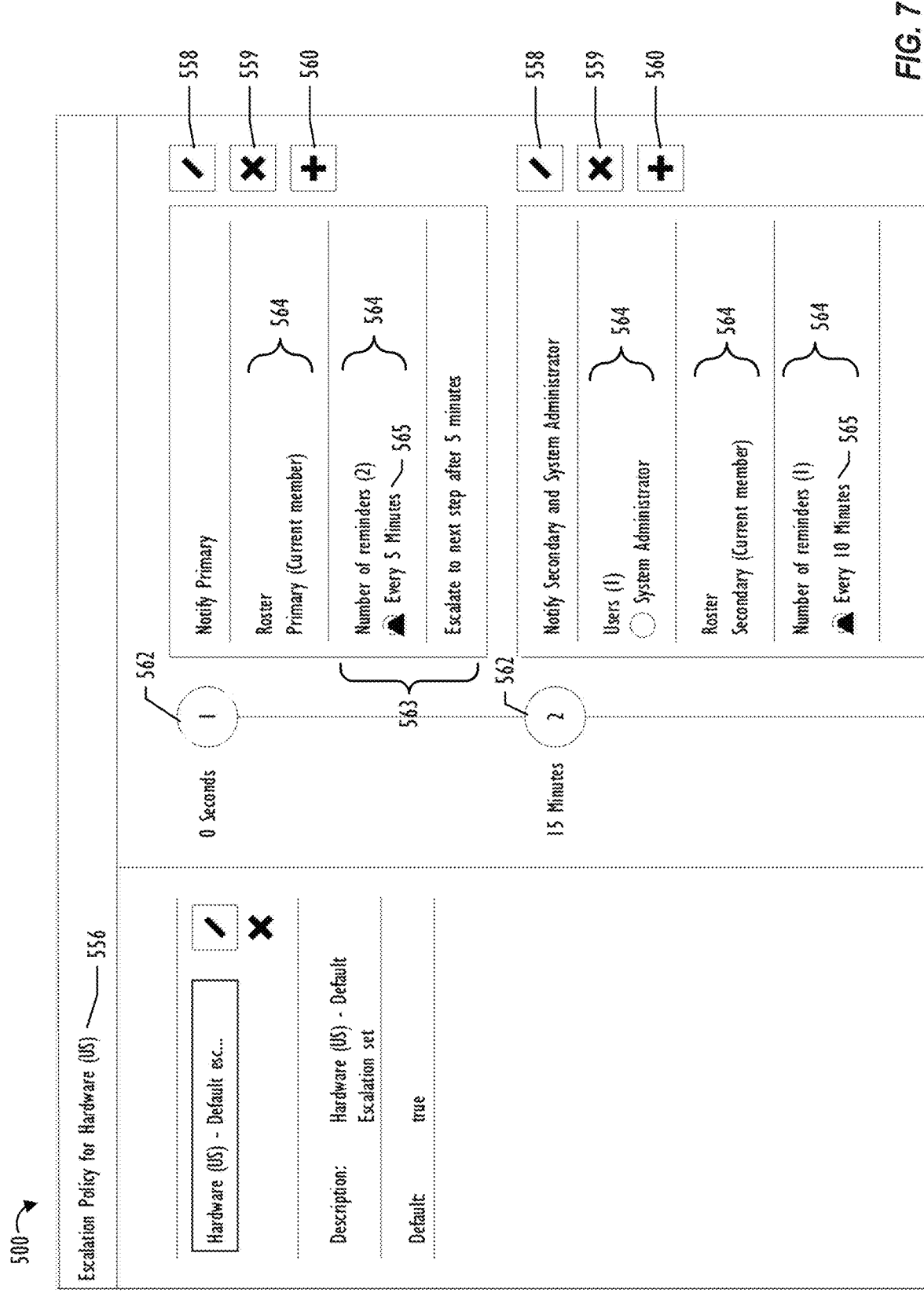
FIG. 7 illustrates an embodiment of a default escalation path a user can set for a particular shift of the on-call schedule with the on-call scheduling user interface.

Step 515 may involve setting (e.g., defining, selecting, adding) member groups or rosters (e.g., primary group, secondary group, and the like) for each of the plurality of shifts and setting corresponding members for each member group of each shift. Step 520 may involve setting one or more escalation paths for each shift defined at step 510. As shown in FIG. 5, on-call scheduling user interface 500 may enable the user at step 520 to select from among pre-existing defined escalation paths for a particular shift of on-call schedule 505 by, for example, operating on drop-down list indicator 530 (i.e., graphical element) of on-call scheduling user interface 500 to select from a plurality of available escalation paths from a drop-down list. Alternately or in addition, as shown in FIGS. 6-7, on-call scheduling user interface 500 may also enable the user to create a new escalation path (escalation policy) or customize an existing escalation path (escalation policy) for a particular time shift. As explained previously, the escalation path defines a chain of on-call members from one or more member groups to be notified in a predetermined order and actions to be taken when a predetermined condition is satisfied (i.e., trigger event corresponding to a particular on-call schedule occurs). The notifications may be sent consistent with contact preferences defined by the on-call members. Details of sending notifications consistent with the user selected contact preferences are explained in connection with FIG. 9 and contact preference management module 450 of FIG. 3. On-call scheduling user interface 500 may further enable the user at step 525 to review (preview) scheduling information for the plurality of shifts of on-call schedule 505 created at steps 510, 515, 520 and save (e.g., publish, activate) the created on-call schedule 505.

Figure 8:
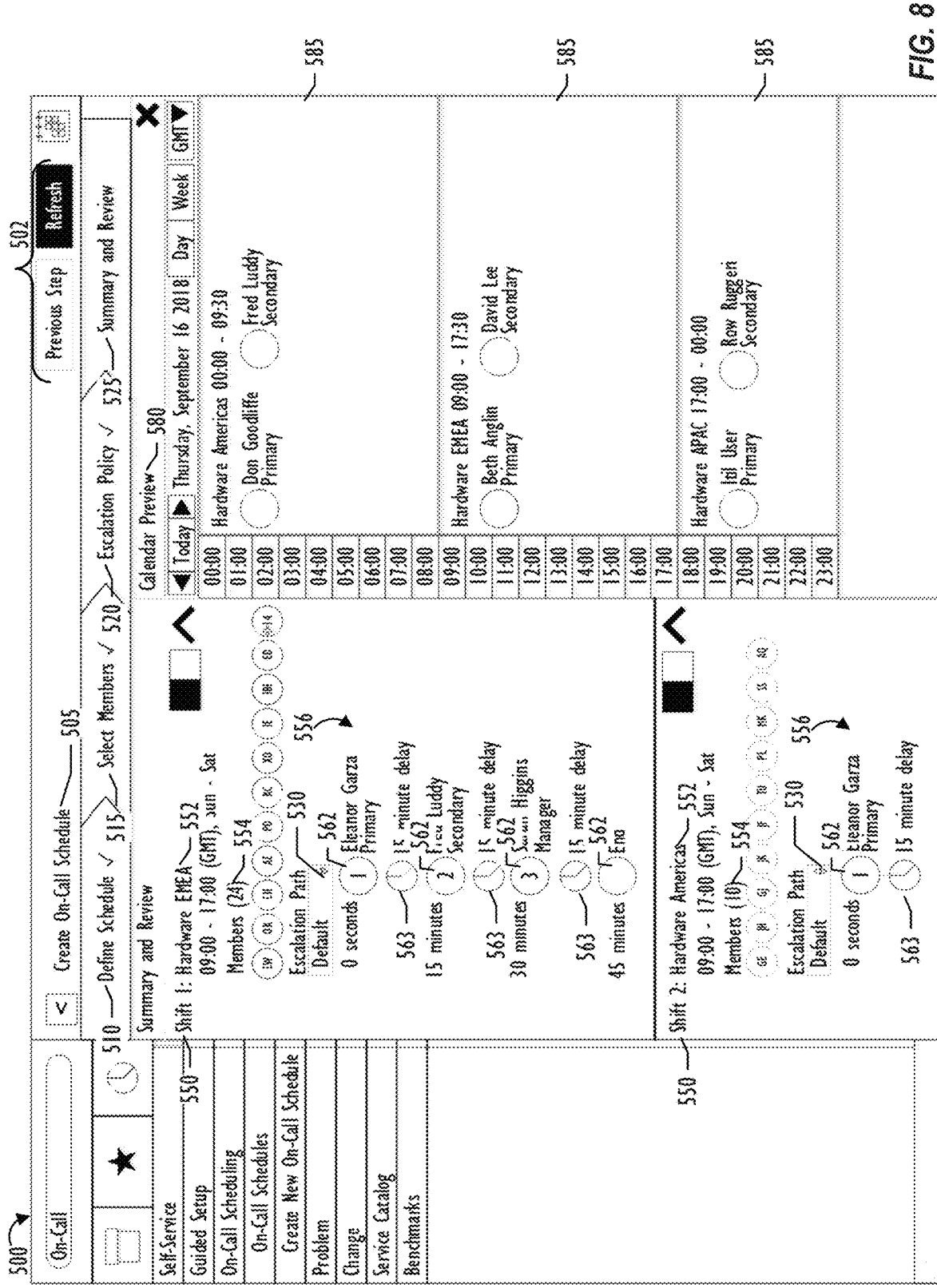
FIG. 8 illustrates an embodiment of scheduling information and calendar information of a plurality of shifts of an on-call schedule presented to the user within the on-call scheduling user interface.

As shown in FIG. 5, on-call scheduling user interface 500 may include menu component 502 that includes a list of functions that a user may perform on on-call schedule 505 during design-time or after activation. In FIGS. 5 and 8, menu component 502 includes menu options or UI actions, such as for "Previous Step," "Next Step," and "save," options. Other embodiments of menu component 502 may include other operations, such as "publish" option and/or a portion of menu options shown in FIGS. 5 and 8. On-call scheduling user interface 500 thus enables the user to make changes to on-call schedule 505 by operating menu component 502 options to navigate between steps 510-525 of the on-call schedule wizard during design-time, or to save or activate on-call schedule 505.

As shown in FIGS. 5-8, on-call scheduling user interface 500 may present shift indicators 550 for the plurality of shifts defined or selected by the user at step 510. Each shift indicator 550 may identify scheduling information for the corresponding shift including shift name, time slot or coverage period, member groups or rosters and corresponding members, and one or more escalation paths. That is, as shown in FIG. 8, for each shift corresponding to shift indicator 550, on-call scheduling user interface 500 may present scheduling information including shift name indicator 552, shift member list indicator 554, and one or more escalation path graphical outlines 556. Escalation path graphical outline 556 may dynamically present to the user during design-time a visual graphical outline of the escalation path that will be followed in case a trigger event associated with on-call schedule 505 occurs during the corresponding shift of on-call schedule 505. For example, escalation path graphical outline 556 illustrated in FIG. 5 graphically shows that when the corresponding escalation path is executed, the on-call member belonging to the 'Primary' group or roster will be notified first, and then, after a one hour wait duration, the on-call member belonging to the 'Secondary' group or roster will be notified, and then, after another one hour wait duration, execution of the escalation path will be completed (followed by any 'catch-all' escalation notifications).

As shown in FIGS. 5 and 8, on-call schedule 505 may also allow the user to change or modify the escalation path by operating on a corresponding drop-down list indicator 530 and selecting one of available pre-defined and user-selectable escalation paths. Exemplary escalation paths selectable or editable by the user are illustrated in FIGS. 6 and 7. In one embodiment, the on-call scheduling user interface 500 may allow the user to set multiple escalation paths for the same shift of on-call schedule 505 by operating graphical element 570 (i.e., graphical element) to add one or more additional escalation paths. Thus, on-call scheduling user interface 500 may set for the same shift of on-call schedule 505, one escalation path as a default escalation path that is to be executed when a first type of trigger event (e.g., low- or medium-priority incident or event) occurs, and another escalation path as a critical escalation path that is to be executed when a second type of trigger event (e.g., high-priority incidents, incidents created by certain important users, and the like) occurs. On-call scheduling user interface 500 may enable further configuration or customization of each escalation path of the shift by operating on graphical elements corresponding to the presented escalation path graphical outline 556.

As shown in FIGS. 5-8, escalation path graphical outline 556 corresponding to the escalation path may include one or multiple escalation step elements 562 and wait duration elements 563 respectively corresponding to multiple escalation steps and associated wait durations. Each escalation step element 562 of outline 556 may include one or multiple escalation sub-step elements 564 and sub-step wait duration elements 565 respectively corresponding to escalation sub-steps or actions and associated sub-step wait durations (e.g., reminder notification wait duration). For example, sub-step element 564 may be a reminder element indicating a number of reminders (e.g., number of additional notification attempts to make after an initial notification attempt) to the on-call user before notifying a next on-call user corresponding to a next escalation step element 562. In case sub-step element 564 is a reminder element, corresponding sub-step wait duration element 565 may be a delay element (e.g., wait duration) indicating a wait period before sending subsequent reminders.

As described above, on-call scheduling user interface 500 may enable the user to make additional modifications to the selected escalation path by operating one or more of operation elements 558, 559, and 560 (i.e., graphical elements) of a corresponding escalation path graphical outline 556. For example, operation element 558 may enable the user to change a wait duration element 563 or sub-step wait duration element 565 for a corresponding escalation step element 562, add one or more escalation sub-step elements 564 to the corresponding escalation step element 562, and the like. Operation element 559 may enable the user to delete the corresponding escalation step element 562 of the escalation path graphical outline 556. And operation element 560 may enable the user to add one or more additional escalation step elements and corresponding wait duration elements 563 for the escalation path graphical outline 556, and/or add one or more escalation sub-step elements 564 and corresponding sub-step wait duration elements 565 for an escalation step element 562. For example, escalation path graphical outline 556 illustrated in FIG. 7 is configured so that when the associated escalation path is executed, the first escalation step corresponding to first escalation step element 562 notifies a current on-call member from the "Primary" roster (i.e., member group), and sends two notification reminders (i.e., reminder element as escalation sub-step element 564;) to the current on-call member every 5 minutes (i.e., delay element as sub-step wait duration element 565). Then, after total 15 minutes have elapsed (i.e., wait duration element 563) since start of execution of the escalation path (and non-receipt of acknowledgement in response to the sent notifications and reminders at the first escalation step), the second escalation step corresponding to the second escalation step element 562 notifies a predetermined user (e.g., "System Administrator"; escalation sub-step element 564) and also notifies a current on-call member from the "Secondary" roster (i.e., member group or roster), and sends one notification reminder (i.e., reminder element as escalation sub-step element 564) to the current on-call member after 10 minutes (i.e., delay element as sub-step wait duration element 565), and so on.

FIG. 5 also shows that on-call scheduling user interface 500 enables the user to input a selection for input field 531 (i.e., graphical element) to specify a 'Catch-all' on-call escalation that is to be executed when none of the notifications issued or made as part of the escalation path associated with escalation path graphical outline 556 are acknowledged by corresponding on-call members during execution of the escalation path. That is, in the example escalation path shown in FIG. 5, when two hours have elapsed since start of execution of the escalation path associated with escalation path graphical outline 556 and when neither the 'Primary' on-call user (corresponding to the 'Primary' escalation step 562) nor the 'Secondary' on-call user (corresponding to the 'Secondary' escalation step 562) have acknowledged receipt of the corresponding notification, on-call scheduling module 420 may be configured to execute the 'catch-all' escalation based on the selection made by the user at input field 531, to, e.g., notify an on-call manager or another supervisor.

Further, FIG. 5 shows that on-call scheduling user interface 500 includes 'Override escalation' flag 532 (i.e., graphical element) that can be set by the user (e.g., on-call manager) setting scheduling information for on-call schedule 505 so as to override the escalation preferences set by the on-call user via contact preference management module 450. In one embodiment, on-call scheduling module 420 may be configured to obtain 'default' contact information for on-call members when the flag is set to true. Thus, in the example escalation path for the 'APAC' shift associated with escalation path graphical outline 556 shown in FIG. 5, when Override escalation flag 532 is set to true, and when the escalation path is executed based on a corresponding trigger event, the 'Primary' on-call user is notified at 'Primary' escalation step 562 using 'default' contact information associated with the current 'Primary' on-call user, without regard to contact preferences of the current 'Primary' on-call user that may be set as first attempt contact preference 910 for the user. Similarly, after one hour has passed since the (unacknowledged) notification is sent to the primary on-call user, 'Secondary' on-call user is notified at 'Secondary' escalation step element 562 using 'default' contact information associated with the current 'Secondary' on-call user, without regard to contact preferences of the current 'Secondary' on-call user that may be set as first attempt contact preference 910 for the user. In one embodiment, override module 440 may thus override contact preferences set by on-call users based on the type of trigger event associated with on-call schedule 505 that caused the escalation path execution. For example, when a particular type of high priority or critical incident occurs (i.e., trigger event associated with on-call schedule detected), it may be desirable to notify on-call users using a faster communication channels (e.g., voice call) as opposed to utilizing the selected contact preference which may involve using a slower communication channel (e.g., email).

As shown in FIGS. 5 and 8, on-call scheduling user interface 500 may also allow the user to preview calendar information generated by on-call scheduling user interface 500 based on set scheduling information of on-call schedule 505, such that the scheduling information and calendar information are concurrently presented on on-call scheduling user interface 500. That is, on-call scheduling user interface 500 may generate or set calendar graphical layout 580 associated with on-call schedule 505 during design-time based on corresponding set scheduling information and dynamically display at least some of the scheduling information for the plurality of time shifts in calendar graphical layout 580. For example, as shown in FIGS. 5 and 8, calendar graphical layout 580 may include coverage period indicators 585 to visually depict coverage periods (e.g., time slots) corresponding to the plurality of shifts of on-call schedule 505, corresponding current on-call members of one or more set member groups (FIG. 8), and the like.

As shown in FIG. 8, after completing steps 510, 515, and 520 of the on-call schedule creation wizard, on-call scheduling user interface 500 may also enable the user to preview on-call schedule 505 at step 520 prior to saving (e.g., publishing, activating) on-call schedule 505. FIG. 8 shows that scheduling information and calendar information is concurrently displayed by presenting on on-call scheduling user interface 500, a plurality of shift indicators 550, corresponding shift name indicators 552, shift member list indicators 554, escalation path graphical outlines 556, calendar graphical layout 580, and coverage period indicators 585. On-call scheduling user interface 500 may enable the user to activate on-call schedule 505 by, for example, operating menu component 502 "Save" option.

Returning to FIG. 4, once on-call schedule 505 is activated, on-call schedule 505 may run as an automated process in the background (e.g., flow plan, enterprise rule, enterprise logic, script includes, scheduled job, and the like) on client instance 415 and on-call scheduling module 420 may be configured to detect a trigger event for on-call schedule 505 when a predetermined condition (e.g., predetermined type of incident or event, task type, urgency, or other predetermined field of an incident or task record) is satisfied. In one embodiment, conditions that may cause trigger events for active on-call schedules may be predefined and continuously monitored by the system. Examples of conditions that may cause the trigger event for on-call schedule 505 include creation of a new incident ticket of a particular type (e.g., belonging to a particular group or unit), occurrence of a predetermined event of a particular type, user operation of a particular type, and the like. Thus, different conditions of different types may be predefined as triggers for different activated on-call schedules 505.

To reduce the number of unacknowledged escalations (e.g., notification attempts or reminder notification attempts), client instance 415 may further include contact preference management module 450 to give on-call members the flexibility to selectively configure contact preferences (e.g., email, SMS, voice, Push, Slack, device preferences, and the like) to receive notifications (and any subsequent reminders) from on-call scheduling module 420 in response to a trigger event for the on-call schedule. Contact preference management module 450 includes contact preference management user interface 900, data model 460, and contact preference management API 465.

A user (e.g., on-call member assigned to a particular group of a particular on-call schedule) of client instance 415 having appropriate privileges may utilize contact preference management user interface 900 to set one or more sets of contact preferences specifying the user's preferred method of receiving notifications in response to on-call schedule trigger events from on-call scheduling module 420. A user accessing client instance 415 from, e.g., a web browser on remote client device 405 may utilize contact preference management user interface 900 to create, modify, review, and manage one or more sets of corresponding contact preferences. In one embodiment, contact preference management user interface 900 may be located on a client device that receives user input. In one embodiment, design-time implementation of contact preference management module 450 can be done through standard platform forms and lists via contact preference management user interface 900. Contact preference management module 450 may be created using any suitable programming language (e.g., Java®) and database management system including one or more relational database tables. In one embodiment, contact preference management module 450 may be implemented based on a user completing and saving a contact preference form or wizard with field values via contact preference management user interface 900, calling a Java API that interfaces with a configuration management database (CMDB) to create data model 460 corresponding to the completed and saved set of contact preferences, and providing one or more contact preference management APIs 465 for interacting with consumers of the created and saved contact preferences and interacting with other modules (e.g., on-call scheduling module 420 and the like) deployed on client instance 415 or on other parts of cloud-based platform 410.

Contact preference management API 465 (e.g., Java API, REST API, and the like) may receive as input information identifying a user (e.g., on-call member) from on-call scheduling module 420 and return one or more sets of contact preferences selectively specified by the user (or return 'default' contact information of the user), so that on-call escalations may be notified to on-call members consistent with their contact preferences (or based on 'default' contact information). Contact preference management API 465 may also include additional API points for retrieving all contact preference details (e.g., multiple sets of contact preferences corresponding different availability time periods) about a single on-call member. In one embodiment, contact preference management API 465 may be a REST API so various automated processes (e.g., activated on-call schedules and the like) can integrate and consume the contact preferences output by contact preference management module 450. An example use case of contact preferences created, modified, saved, managed, and previewed by a user with contact preference management user interface 900 is shown in FIG. 9.

Figure 9:
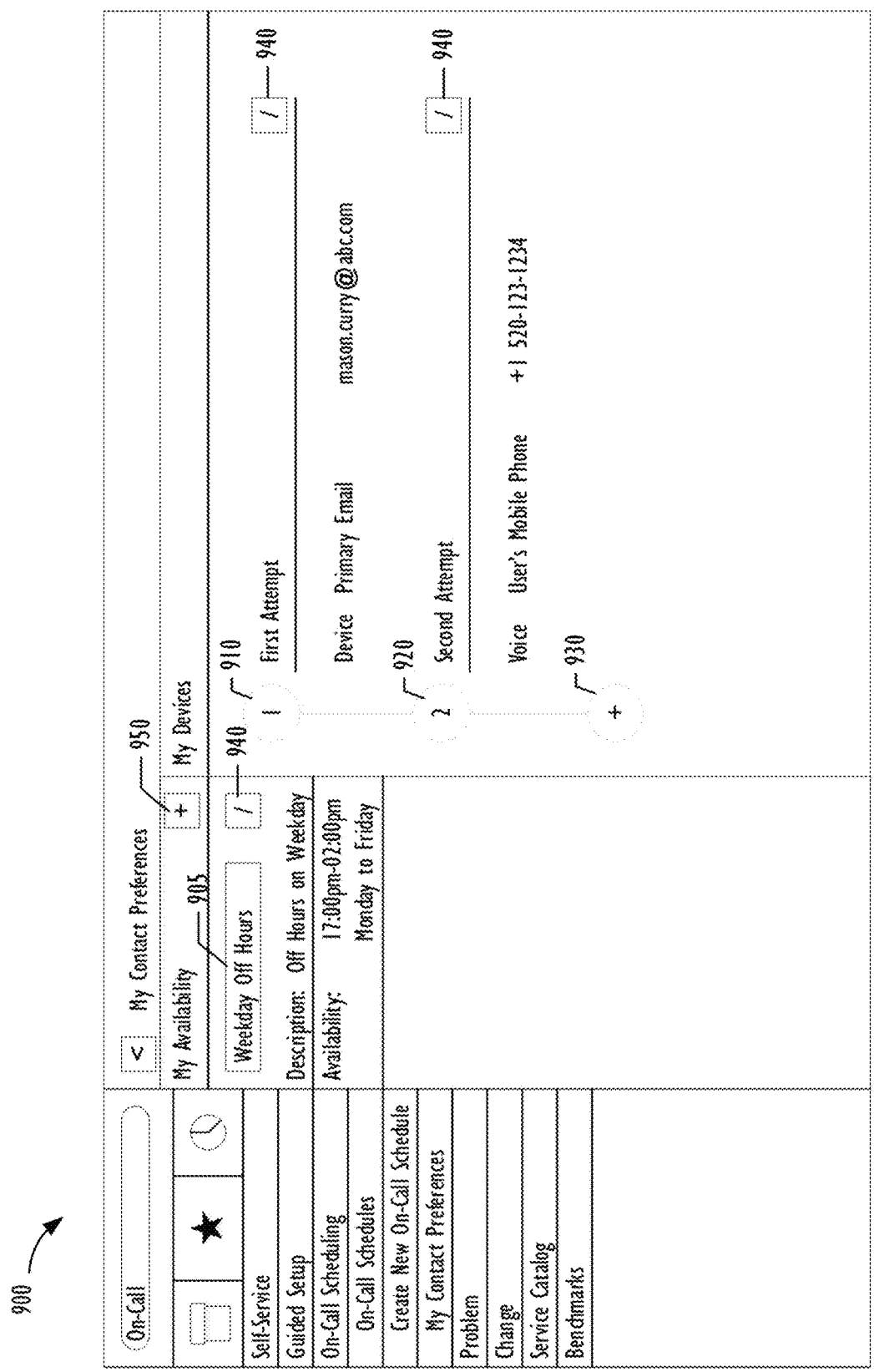
FIG. 9 illustrates an embodiment of contact preference information set by a user with the contact preference management user interface.

As shown in FIG. 9, contact preference management user interface 900 permits a user to create, modify, manage, preview, and save (e.g., activate, publish) one or more sets of contact preferences so that the user can selectively specify where and when they will be notified (including any subsequent reminder notifications) when an on-call escalation path is executed that includes the user as the current on-call member. FIG. 9 illustrates an exemplary set of contact preferences 905 a user (e.g., on-call member who is responsible for resolving incidents or issues, or respond to predetermined events impacting predetermined systems, components, or processes of the enterprise associated with client instance 415) can create, modify, or save with contact preference management user interface 900 in accordance with one or more embodiments. In the example shown in FIG. 9, contact preference management user interface 900 enables the user to define contact preference sets based on availability hours (e.g., a first set of contact preferences for weekday off hours, a second set of contact preferences for weekday business hours, a third set of contact preferences for weekends and holidays, and so on). In another embodiment, contact preference management user interface 900 may enable the user to define contact preference sets based on other criteria like the particular on-call schedule consuming the contact preferences, time of year, and so on. For each set of contact preferences 905, contact preference management user interface 900 enables the user to define contact preferences for each of a plurality of attempts (e.g., first attempt, second attempt, and so on). As shown in FIG. 9, contact preference management user interface 900 presents first attempt contact preference element 910 indicating user-specified contact preferences (e.g., email) when on-call scheduling module 420 makes a first attempt to notify the on-call member regarding an issue (e.g., event, incident, task) that has come up and that has caused a trigger event for a corresponding on-call schedule. Further, contact preference management user interface 900 presents second attempt contact element 920 indicating user-specified contact preferences (e.g., voice call) when on-call scheduling module 420 makes a second attempt to notify the on-call member regarding an issue.

Contact preference management user interface 900 may further include additional preference element 930 to enable the user to add additional contact preferences when making third or subsequent attempts to contact or notify the user when a trigger event for an on-call schedule occurs. FIG. 9 also shows that contact preference management user interface 900 may further include elements 940 to enable the user to change contact preferences associated with first and second attempt contact elements 910 and 920, or change availability hours associated with the set of contact preferences 905. As shown in FIG. 9, contact preference management user interface 900 may also include element 950 to enable the user to add additional sets of contact preferences.

Once one or more sets of contact preferences 905 are saved (e.g., published, activated) by the user, contact preference management API 465 may provide appropriate contact preference data in response to a request from a consumer (e.g., on-call scheduling module 420) for contact preference data for a specific user. For example, in case on-call scheduling module 420 executes the escalation path associated with escalation path graphical outline 556 illustrated in FIG. 7, and assuming the user whose contact preferences are illustrated in contact preference set 905 is a current on-call member of the "Primary" roster, if the time when the escalation path is executed falls within the availability period associated with set 905, on-call scheduling module 420 may obtain contact preference data identified by first and second attempt contact elements 910 and 920 of set 905, and make a first notification attempt to notify the on-call user based on the contact preference (e.g., email) associated with first attempt contact preference element 910, and if the first attempt notification remains unacknowledged after 5 minutes, make a second notification attempt to notify the on-call user based on the contact preferences (e.g., voice call) associated with second attempt contact preference element 920. Similarly, if the time when the escalation path is executed falls within a different availability period, on-call scheduling module 420 may obtain contact preference data associated with a different contact preference set corresponding to the different availability period, if such a set is available (and fallback to 'default' contact information if unavailable).

Contact preference management user interface 900 may also enable the user (or an on-call manger) to specify 'default' contact preferences (e.g., cell phone number) that are used for on-call escalation notifications when appropriate contact preferences are not otherwise set by the user, or when override module 440 overrides contact preferences set by the user based on the type of trigger event associated with on-call schedule 505. For example, as explained above in connection with FIG. 5, when Override escalation flag 532 is set to true by the on-call manager, override module 440 may cause notification attempts arising out of the corresponding escalation path to be made using 'default' (or high priority) contact information associated with the on-call user, and override any user set contact preference, thereby ensuring the fastest possible response time for trigger events of a predetermined type (e.g., high-priority incidents or critical events). In this case, the on-call manager may specify use of 'default' (or high priority) contact information with the on-call user, to ensure high response time. The on-call manager may thus control the 'default' contact information for on-call users and specify when the 'default' contact information is to be used during on-call scheduling.

When the contact preference data (or default contact information data in case of, e.g., override) is returned by contact preference management API 465 to on-call scheduling module 420, on-call scheduling module 420 may handle execution of the escalation path and issuing notifications to appropriate devices and using appropriate communication channels via notification module 445. In one embodiment, notification module 445 may be communicatively coupled with notification interface 475 and may include one or more APIs to accept notify requests based on the executed escalation path. Notification module 445 may cause creation of automated outbound notifications via a framework provided by notification interface 475 that supports integration with multiple service provides. In one embodiment, notification interface 475 may support integration with a variety of telephony/conferencing service provides like Twilio®, Cisco WebEx®, Spark®, Zoom®, Nexmo®, and the like. The system may thus automatically notify appropriate users when a trigger event happens, to, e.g., gather appropriate team of users for an emergency conference call to resolve an issue that has come up.

Figure 10:
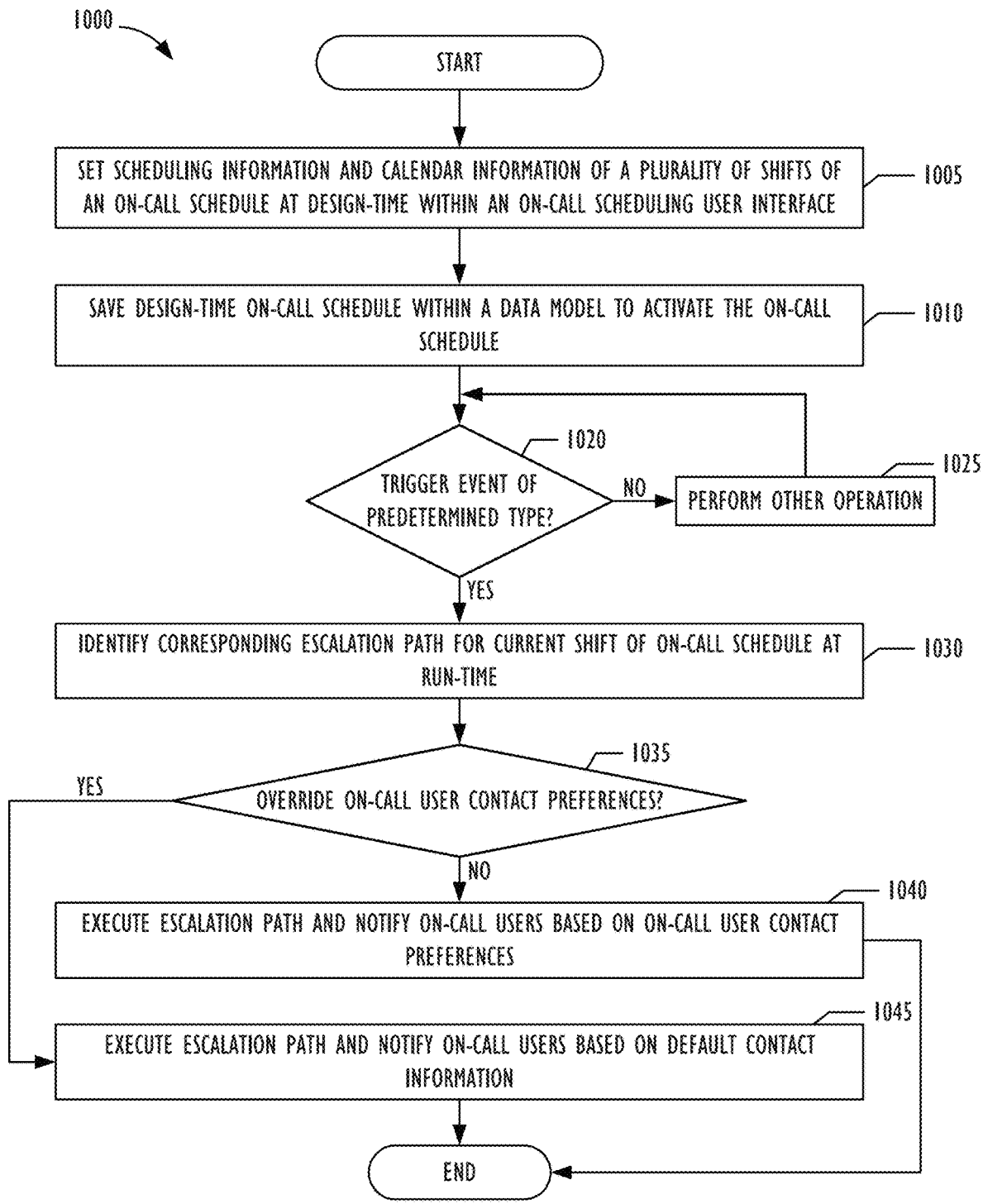
FIG. 10 is a flowchart of an embodiment of a method that sets and executes an on-call schedule that consumes individualized contact preferences set by on-call users.

FIG. 10 is a flowchart of an embodiment of method 1000 that sets and executes an on-call schedule that consumes contact preferences selected by on-call users. Method 1000 begins at block 1005 where on-call scheduling user interface 500 enables the user with appropriate privileges to set (e.g., create, modify, manage) on-call schedule 505. In one embodiment, on-call scheduling user interface 500 may present steps 510, 515, and 520 of an on-call scheduling wizard to set the scheduling information and the calendar information based on user input. At block 1010, on-call scheduling module 420 may save on-call schedule 505 set during design-time based on user operation within a data model. For example, once the user has finalized the on-call schedule by configuring the scheduling information, on-call scheduling user interface 500 may execute step 525 of the on-call scheduling wizard based on user operation to enable the user to review the scheduling information and calendar information of on-call schedule 505. On-call scheduling user interface 500 may further enable the user to save (e.g., activate or publish) the on-call schedule after the review by operating menu component 502 "Save" function. Once the on-call schedule is saved, on-call scheduling module 420 may call an API that interfaces with a database to create data model 430 corresponding to the completed and saved on-call schedule.

Method 1000 then proceeds to block 1020 where an automated-process of on-call scheduling module 420 runs in the background to detect whether a trigger event has occurred and what type of trigger event has occurred. Types of trigger events that constitute as 'triggers' for a given saved and activated on-call schedule may be predefined. For example, if an on-call schedule is created to solve issues or incidents related to 'hardware,' one or more groups of members from the hardware team may be added as on-call members and may take turns during different shifts and days of week to provide continuous coverage and be on-call to resolve 'hardware' related issues. Thus, for the 'hardware' on-call schedule, trigger events of type 'hardware' may constitute as events that 'trigger' the 'hardware' on-call schedule. The automated process of on-call scheduling module 420 may be configured to automatically detect trigger events and respective trigger event types as and when they occur (e.g., detect trigger event based on creation of a new incident record in the incident table, new task record in the task table, and the like, and detect trigger event type based on predetermined fields of the incident record, or the task record, and the like). If no trigger event is detected (NO at block 1020), on-call scheduling module 420 performs other operation at block 1025 and continues to wait for detection of a trigger event.

If the trigger event is detected (YES at block 1020), on-call scheduling module 420 identifies an activated on-call schedule (if any) that corresponds to the type of the detected trigger event (block 1030). Further, on-call scheduling module 420 identifies one of the plurality of shifts of the on-call schedule identified at block 1030 during which the trigger event at block 1020 occurred (e.g., the current shift). Still further, on-call scheduling module 420 at block 1030 identifies one or more members who are currently on call for the identified one of the plurality of shifts of the identified on-call schedule based on the scheduling information of the on-call schedule. And still further, on-call scheduling module 420 at block 1030 identifies an escalation path of the on-call schedule that corresponds to the identified one of the plurality of shifts. In one embodiment, a plurality of escalation paths (e.g., default escalation path, critical incident escalation path, and the like) may be configured for a given shift of a given on-call schedule, and on-call scheduling module 420 may identify one of the plurality of escalation paths based on the trigger event type. For example, if the predetermined field of the incident record or the task record detected as the trigger event at block 1020 identifies the incident or task as 'critical' (e.g., P1 incident or task), on-call scheduling module 420 may identify the escalation path for critical incidents or tasks as an escalation path for execution at block 1030. As another example, if the predetermined field of the incident record or the task record detected as the trigger event at block 1020 does not identify the incident or task as 'critical', on-call scheduling module 420 may identify the default escalation path as an escalation path for execution at block 1030.

Method 1000 then proceeds to decision block 1035 where on-call scheduling module 420 determines whether contact preferences of the on-call members identified at block 1030 are to be utilized when executing the identified escalation path. In one embodiment, as shown in FIG. 5, each escalation path may have an 'Override escalation' flag 532 that determines whether the particular escalation path allows on-call users to be notified based on their individualized contact preferences (flag 532 set to false) or whether the particular escalation path dictates an override of the contact preferences set by the on-call members (flag 532 set to true). For example, if a particular escalation path is designed to handle critical incidents, it may be desired that the on-call member be notified by a predetermined communication channel (e.g., voice call), regardless of the contact preferences selected by the user. By setting flag 532 to true, the manager setting the escalation path can override individualized contact preferences to ensure optimized handling of, e.g., critical or high-priority incidents or tasks (i.e., trigger events) as and when they occur.

Thus, at block 1035, if it is determined that identified escalation path is not set to override on-call user contact preferences (NO at block 1035), on-call scheduling module 420 may execute the escalation path identified at block 1030 by obtaining individualized contact preferences of current on-call users from contact preference management module 450 (FIG. 9) and notify (and send notification reminders) the current on-call members as defined in the escalation path and based on the contact preferences individually set by the current on-call members (block 1040). For example, if an on-call member has saved a contact preference set as illustrated in FIG. 9, and if the escalation path identified at block 1030 involves sending a notification to the user followed by a notification reminder if the initial notification is unacknowledged for a predetermined time period, assuming the availability hours identified in the contact preference set 905 are current, on-call scheduling module 420 at block 1040 may send the initial notification to the on-call member based on the member's first attempt contact preference (e.g., specified email address), and send any subsequent reminder based on the member's second attempt contact preference (e.g., mobile phone number). At block 1040, on-call scheduling module 420 may notify the current on-call member based on a different set of contact preferences selected by the members if the current time (when the escalation path is executed) points to a different contact preference set of the member.

On the other hand, at block 1035, if it is determined that identified escalation path is set to override on-call user contact preferences (YES at block 1035), on-call scheduling module 420 may execute the escalation path identified at block 1030 by obtaining 'default' contact information of current on-call users from contact preference management module 450 and notify (and send notification reminders) the current on-call members as defined in the escalation path and based on the default contact information without regard to any contact preferences individually set by the current on-call members (block 1045). For example, if the escalation path being executed is designed to handle high-priority incidents, use of the fastest communication channels to notify members may be ensured by overriding any contact preferences of the members.

Figure 11:
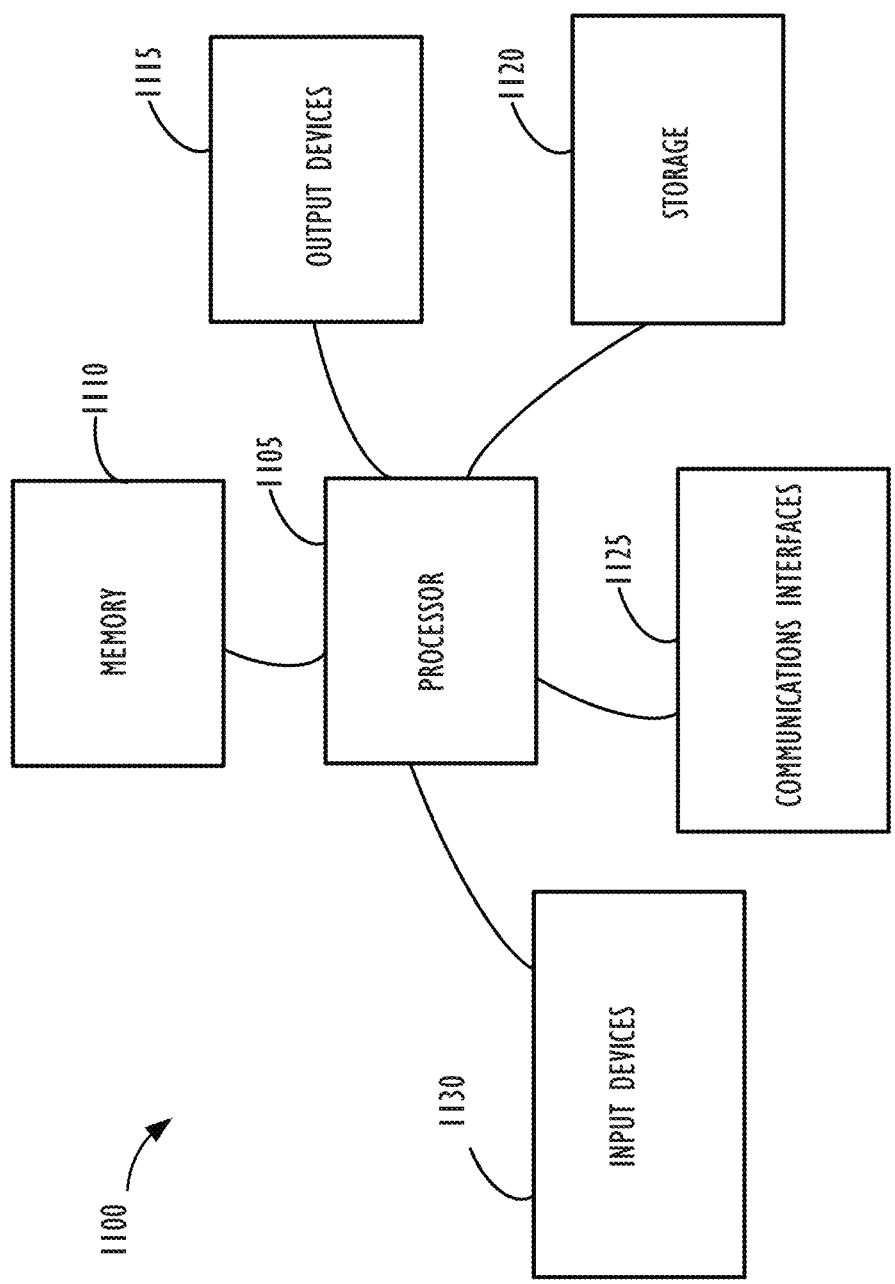
FIG. 11 illustrates a high-level block diagram of a processing device (computing system) that may be used to implement one or more disclosed embodiments.

FIG. 11 illustrates a high-level block diagram 1100 of a processing device (computing device or system) that may be used to implement one or more disclosed embodiments (e.g., client computers 115, cloud resources platform/network 210, client devices 204A-204E, client instance 308, server instances 214, data centers 306A-306B, client instance 415, etc.). For example, computing device 1100 illustrated in FIG. 11 could represent a client device or a physical server device and include either hardware or virtual processor(s) depending on the level of abstraction of the computing device. In some embodiments, (without abstraction) computing device 1100 and its elements as shown in FIG. 11 each relate to physical hardware, and in other embodiments, one, more, or all of the elements could be implemented using emulators or virtual machines as levels of abstraction. In any case, no matter how many levels of abstraction away from the physical hardware, computing device 1100 at its lowest level may be implemented on physical hardware. As also shown in FIG. 11, computing device 1100 may include one or more input devices 1130, such as a keyboard, mouse, touchpad, or sensor readout (e.g., biometric scanner) and one or more output devices 1115, such as displays, speakers for audio, or printers. Some devices may be configured as input/output devices also (e.g., a network interface or touchscreen display). Computing device 1100 may also include communications interfaces 1125, such as a network communication unit that could include a wired communication component and/or a wireless communications component, which may be communicatively coupled to processor 1105. The network communication unit may utilize any of a variety of proprietary or standardized network protocols, such as Ethernet, TCP/IP, to name a few of many protocols, to effect communications between devices. Network communication units may also comprise one or more transceivers that utilize the Ethernet, power line communication (PLC), Wi-Fi, cellular, and/or other communication methods.

As illustrated in FIG. 11, processing device 1100 includes a processing element such as processor 1105 that contains one or more hardware processors, where each hardware processor may have a single or multiple processor cores. In one embodiment, the processor 1105 may include at least one shared cache that stores data (e.g., computing instructions) that are utilized by one or more other components of processor 1105. For example, the shared cache may be a locally cached data stored in a memory for faster access by components of the processing elements that make up processor 1105. In one or more embodiments, the shared cache may include one or more mid-level caches, such as level 2 (L2), level 3 (L3), level 4 (L4), or other levels of cache, a last level cache (LLC), or combinations thereof. Examples of processors include, but are not limited to a central processing unit (CPU) or a microprocessor. Although not illustrated in FIG. 11, the processing elements that make up processor 1105 may also include one or more other types of hardware processing components, such as graphics processing units (GPUs), application specific integrated circuits (ASICs), field-programmable gate arrays (FPGAs), and/or digital signal processors (DSPs).

FIG. 11 illustrates that memory 1110 may be operatively and communicatively coupled to processor 1105. Memory 1110 may be a non-transitory medium configured to store various types of data. For example, memory 1110 may include one or more volatile devices such as random-access memory (RAM). Non-volatile storage devices 1120 can include one or more disk drives, optical drives, solid-state drives (SSDs), tap drives, flash memory, read only memory (ROM), and/or any other type memory designed to maintain data for a duration time after a power loss or shut down operation. In certain instances, the non-volatile storage devices 1120 may be used to store overflow data if allocated RAM is not large enough to hold all working data. The non-volatile storage devices 1120 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 1105. In one embodiment, the compiling process of the software program may transform program code written in a programming language to another computer language such that the processor 1105 is able to execute the programming code. For example, the compiling process of the software program may generate an executable program that provides encoded instructions (e.g., machine code instructions) for processor 1105 to accomplish specific, non-generic, particular computing functions.

After the compiling process, the encoded instructions may then be loaded as computer executable instructions or process steps to processor 1105 from storage 1120, from memory 1110, and/or embedded within processor 1105 (e.g., via a cache or on-board ROM). Processor 1105 may be configured to execute the stored instructions or process steps in order to perform instructions or process steps to transform the computing device into a non-generic, particular, specially programmed machine or apparatus. Stored data, e.g., data stored by a storage device 1120, may be accessed by processor 1105 during the execution of computer executable instructions or process steps to instruct one or more components within the computing device 1100.

A user interface (e.g., output devices 1115 and input devices 1130) can include a display, positional input device (such as a mouse, touchpad, touchscreen, or the like), keyboard, or other forms of user input and output devices. The user interface components may be communicatively coupled to processor 1105. When the output device is or includes a display, the display can be implemented in various ways, including by a liquid crystal display (LCD) or a cathode-ray tube (CRT) or light emitting diode (LED) display, such as an organic LED (OLED) display. Persons of ordinary skill in the art are aware that the computing device 300 may comprise other components well known in the art, such as sensors, powers sources, and/or analog-to-digital converters, not explicitly shown in FIG. 11.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes 2, 3, 4, etc.; greater than 0.10 includes 0.11, 0.12, 0.13, etc.). The use of the term "about" means±10% of the subsequent number, unless otherwise stated.

Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure.

It is to be understood that the above description is intended to be illustrative and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled. It should be noted that the discussion of any reference is not an admission that it is prior art to the present invention, especially any reference that may have a publication date after the priority date of this application.

What is claimed is:

1. A system comprising:
   non-transitory memory; and
   one or more hardware processors configured to read instructions from the non-transitory memory to cause the one or more hardware processors to:
      generate for display, a design time graphical user interface (GUI) configured to define one or more escalation paths for an on-call schedule;
      receive, via a first window of the design time GUI, first inputs from a user defining a first escalation path for incidents of a first level of priority, wherein the first escalation path comprises a first escalation step and a second escalation step;
      display, via a second window of the design time GUI, based on the first inputs, scheduling information for each of a plurality of shifts of the on-call schedule, the scheduling information including a first escalation path graphical outline associated with the first escalation path and a second escalation path graphical outline associated with a second escalation path for incidents of a second level of priority, wherein the first escalation path graphical outline comprises a plurality of escalation step elements corresponding to a plurality of respective escalation steps, including a first escalation step element and a second escalation step element, and at least one wait duration element, wherein the at least one wait duration element comprises a first wait duration defining a first amount of time to wait before escalating from the first escalation step to the second escalation step;
      receive, via the second window of the design time GUI, second inputs adding a sub-step element corresponding to a respective escalation step element of the plurality of escalation step elements of the first escalation path graphical outline, wherein the sub-step element comprises a reminder element and a delay element respectively identifying a number of notification attempts to be made to an on-call user before notifying a next on-call user corresponding to a next escalation step element, and a delay time period, wherein the delay time period defines an elapsed time before a next notification attempt is made to the on-call user;
      receive an incident and an indication whether the incident is of the first level of priority or the second level of priority;
      select an escalation path from the first escalation path and the second escalation path based on whether the incident is of the first level of priority or the second level of priority;
      execute the selected escalation path associated with a current one of the plurality of shifts of the on-call schedule at run-time; and
      transmit a notification to a computing device associated with the on-call user associated with the current one of the plurality of shifts based on the selected escalation path, wherein the selected escalation path is configured to make a first notification attempt to notify the on-call user based on a first attempt contact preference selected by the on-call user, and make a second notification attempt to notify the on-call user based on a second attempt contact preference selected by the on-call user.

2. The system according to claim 1, wherein the on-call user comprises a first on-call user determined based on the first escalation step of the first escalation path and based on a first contact preference for the first on-call user, and after elapse of the first corresponding wait duration, transmit a second notification to a second computing device associated with a second on-call user based on the second escalation step of the first escalation path and based on a second contact preference selected by the second on-call user.

3. The system according to claim 1, wherein the one or more hardware processors are configured to read instructions from the non-transitory memory to cause the one or more hardware processors to display, via the design time GUI, calendar information associated with the plurality of shifts of the on-call schedule, the calendar information indicating a coverage period of each of the plurality of shifts.

4. The system according to claim 3, wherein the scheduling information and the calendar information for the plurality of shifts of the on-call schedule is concurrently presented on the design time GUI.

5. The system according to claim 4, wherein the scheduling information includes member information of a plurality of members associated with a shift of the plurality of shifts.

6. The system according to claim 1, wherein the one or more hardware processors are configured to read instructions from the non-transitory memory to cause the one or more hardware processors to modify the scheduling information by modifying the first escalation path graphical outline based on the first inputs related to one of a plurality of graphical elements associated with the first escalation path graphical outline.

7. The system according to claim 6, wherein the first escalation path graphical outline is modified based on the first inputs to at least one of:
modify a selected wait duration element corresponding to a corresponding escalation step element;
add or remove a selected escalation step element; and
remove the sub-step element corresponding to the corresponding escalation step element.

8. The system according to claim 1, wherein the one or more hardware processors are configured to read instructions from the non-transitory memory to cause the one or more hardware processors to receive, via a third window of the design time GUI, third inputs from the user defining the second escalation path for incidents of the second level of priority, wherein the second escalation path comprises a third escalation step and a fourth escalation step.

9. The system according to claim 8, wherein the third inputs comprise:
a selection of a third recipient to be notified for the third escalation step;
a third number of reminders for the third escalation step or a third period of time between reminders for the third escalation step, or both;
a third wait duration for the third escalation step, comprising a third amount of time to wait before escalating to the fourth escalation step;
a selection of a fourth recipient to be notified for the fourth escalation step; and
a fourth number of reminders for the fourth escalation step or a fourth period of time between reminders for the fourth escalation step, or both.

10. A method for on-call scheduling, comprising:
generating for a display, a design time graphical user interface (GUI) configured to define one or more escalation paths for an on-call schedule;
receiving, via a first window of the design time GUI, first inputs from a user defining a first escalation path for incidents of a first level of priority, wherein the first escalation path comprises a first escalation step and a second escalation step, wherein the first inputs comprise:
a selection of a first recipient to be notified for the first escalation step;
a first number of reminders for the first escalation step or a first period of time between reminders for the first escalation step, or both;
a first wait duration for the first escalation step, comprising a first amount of time to wait before escalating to the second escalation step;
a selection of a second recipient to be notified for the second escalation step; and
a second number of reminders for the second escalation step or a second period of time between reminders for the second escalation step, or both;
displaying, via a second window of the design time GUI, based on the first inputs, scheduling information for each of a plurality of shifts of the on-call schedule, the scheduling information including a first escalation path graphical outline associated with the first escalation path and a second escalation path graphical outline associated with a second escalation path for incidents of a second level of priority, wherein the first escalation path graphical outline comprises:
a first escalation step element corresponding to the first escalation step;
a first corresponding wait duration element corresponding to the first escalation step;
a second escalation step element corresponding to the second escalation step;
a second corresponding wait duration element corresponding to the second escalation step; and
receive, via the second window of the design time GUI, second inputs adding a sub-step element corresponding to a respective escalation step element of the first escalation path graphical outline, wherein the sub-step element comprises a reminder element and a delay element respectively identifying a number of notification attempts to be made to an on-call user before notifying a next on-call user corresponding to a next escalation step element, and a delay time period, wherein the delay time period defines an elapsed time before a next notification attempt is made to the on-call user;
receiving an incident and an indication whether the incident is of the first level of priority or the second level of priority;
selecting an escalation path from the first escalation path and the second escalation path based on whether the incident is of the first level of priority or the second level of priority;
executing the selected escalation path associated with a current one of the plurality of shifts of the on-call schedule at run-time; and
transmitting a notification to a computing device associated with the on-call user associated with the current one of the plurality of shifts based on the selected escalation path, wherein the selected escalation path is configured to make a first notification attempt to notify the on-call user based on a first attempt contact preference selected by the on-call user, and make a second notification attempt to notify the on-call user based on a second attempt contact preference selected by the on-call user.

11. The method according to claim 10, wherein the on-call user comprises a first on-call user determined based on the first escalation step of the first escalation path and based on a contact preference for the first on-call user, and after elapse of the first corresponding wait duration, transmit a second notification to a second computing device associated with a second on-call user based on the second escalation step of the first escalation path and based on a second contact preference selected by the second on-call user.

12. The method according to claim 10, comprising displaying, via the design time GUI, calendar information associated with the plurality of shifts of the on-call schedule, the calendar information indicating a coverage period of each of the plurality of shifts, wherein the scheduling information and the calendar information for the plurality of shifts of the on-call schedule is concurrently presented on the design time GUI, and wherein the scheduling information includes member information of a plurality of members associated with a shift of the plurality of shifts.

13. The method according to claim 10, comprising modifying the scheduling information by modifying the first escalation path graphical outline based on user operation on one of a plurality of graphical elements within the first escalation path graphical outline, wherein the first escalation path graphical outline is modified based on the first inputs to at least one of:
modify a selected wait duration element corresponding to a corresponding escalation step element; and
add or remove a selected escalation step element
remove the sub-step element corresponding to the respective escalation step element.

14. A non-transitory computer readable recording medium having stored thereon a program for on-call scheduling, comprising computer executable instructions that when executed by one or more processing units cause the one or more processing units to:
generate for a display, a design time graphical user interface (GUI) configured to define one or more escalation paths for an on-call schedule;
receive, via a first window of the design time GUI, first inputs from a user defining a first escalation path for incidents of a first level of priority, wherein the first escalation path comprises a first escalation step and a second escalation step, wherein the first inputs comprise:
a selection of a first recipient to be notified for the first escalation step;
a first number of reminders for the first escalation step or a first period of time between reminders for the first escalation step, or both;
a first wait duration for the first escalation step, comprising a first amount of time to wait before escalating to the second escalation step;
a selection of a second recipient to be notified for the second escalation step; and
a second number of reminders for the second escalation step or a second period of time between reminders for the second escalation step, or both;
display, via a second window of the design time GUI, based on the first inputs, scheduling information for each of a plurality of shifts of the on-call schedule, the scheduling information including a first escalation path graphical outline associated with the first escalation path and a second escalation path graphical outline associated with a second escalation path for incidents of a second level of priority, wherein the first escalation path graphical outline comprises:
a first escalation step element corresponding to the first escalation step;
a first corresponding wait duration element corresponding to the first escalation step;
a second escalation step element corresponding to the second escalation step;
a second corresponding wait duration element corresponding to the second escalation step; and receive, via the second window of the design time GUI, second inputs adding a sub-step element corresponding to a respective escalation step element of the first escalation path graphical outline, wherein the sub-step element comprises a reminder element and a delay element respectively identifying a number of notification attempts to be made to an on-call user before notifying a next on-call user corresponding to a next escalation step element, and a delay time period, wherein the delay time period defines an elapsed time before a next notification attempt is made to the on-call user;
receive an incident and an indication whether the incident is of the first level of priority or the second level of priority;
select an escalation path from the first escalation path and the second escalation path based on whether the incident is of the first level of priority or the second level of priority;
execute the selected escalation path associated with a current one of the plurality of shifts of the on-call schedule at run-time; and
transmit a notification to a computing device associated with the on-call user associated with the current one of the plurality of shifts based on the selected escalation path, wherein the selected escalation path is configured to make a first notification attempt to notify the on-call user based on a first attempt contact preference selected by the on-call user, and make a second notification attempt to notify the on-call user based on a second attempt contact preference selected by the on-call user.

15. The non-transitory computer readable medium according to claim 14, wherein the on-call user comprises a first on-call user determined based on the first escalation step of the first escalation path and based on a first contact preference for the first on-call user, and after elapse of the first corresponding wait duration, transmit a second notification to a second computing device associated with a second on-call user based on the second escalation step of the first escalation path and based on a second contact preference selected by the second on-call user.

16. The non-transitory computer readable medium according to claim 14, wherein the instructions cause the one or more processing units to display, via the design time GUI, calendar information associated with the plurality of shifts of the on-call schedule, the calendar information indicating a coverage period of each of the plurality of shifts,
wherein the scheduling information and the calendar information for the plurality of shifts of the on-call schedule is concurrently presented on the design time GUI, and
wherein the scheduling information includes member information of a plurality of members associated with a shift of the plurality of shifts.

* * * * *